United States Patent
Sharma et al.

(10) Patent No.: US 9,925,869 B2
(45) Date of Patent: Mar. 27, 2018

(54) TWO-SPEED TRANSFER CASE WITH NON-SYNCHRONIZED RANGE SHIFT MECHANISM AND ON-THE-MOVE RANGE SHIFT CONTROL SYSTEM

(71) Applicant: Magna Powertrain of America, Inc., Troy, MI (US)

(72) Inventors: Anupam Sharma, Troy, MI (US); Yu-Feng Hung, Troy, MI (US); Adam Naish, Rochester, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 121 days.

(21) Appl. No.: 14/966,358

(22) Filed: Dec. 11, 2015

(65) Prior Publication Data

US 2016/0176407 A1   Jun. 23, 2016

Related U.S. Application Data

(60) Provisional application No. 62/093,132, filed on Dec. 17, 2014.

(51) Int. Cl.
| | |
|---|---|
| *B60K 17/346* | (2006.01) |
| *B60K 17/08* | (2006.01) |
| *B60K 17/35* | (2006.01) |
| *B60K 23/08* | (2006.01) |

(52) U.S. Cl.
CPC .......... *B60K 17/3467* (2013.01); *B60K 17/08* (2013.01); *B60K 17/3462* (2013.01); *B60K 17/35* (2013.01); *B60K 23/0808* (2013.01); *B60K 2023/0858* (2013.01)

(58) Field of Classification Search
None
See application file for complete search history.

(56) References Cited

U.S. PATENT DOCUMENTS

| | | |
|---|---|---|
| 5,054,335 A | 10/1991 | Andrews |
| 5,199,325 A | 4/1993 | Reuter et al. |
| 5,346,442 A | 9/1994 | Eastman |
| 5,368,145 A | 11/1994 | Davis |
| 5,522,777 A | 6/1996 | Baxter et al. |
| 5,655,986 A | 8/1997 | Wilson et al. |
| 5,673,592 A | 10/1997 | Huggins et al. |
| 5,911,644 A | 6/1999 | Williams |
| 6,056,666 A | 5/2000 | Williams |

(Continued)

*Primary Examiner* — Justin Holmes
(74) *Attorney, Agent, or Firm* — Dickinson Wright PLLC

(57) ABSTRACT

A transfer case for a four-wheel drive motor vehicle includes a two-speed range clutch unit, a mode clutch unit, a power-operated actuation mechanism and a control system. The actuation mechanism includes an electric motor, a geartrain driven by the motor for controlling rotation of an actuator shaft, a range actuator assembly and a mode actuator assembly. The range actuator assembly functions to move a shift collar associated with the range unit in response to rotation of the actuator shaft. The mode actuator assembly includes a mode cam and a ballramp unit. The mode cam is rotatively driven by the actuator shaft for controlling the clutch engagement force exerted on the friction clutch by the ballramp unit. The control system controls movement of the shift collar during motive operation of the motor vehicle to permit on-the-move range shifting.

20 Claims, 22 Drawing Sheets

(56) References Cited

U.S. PATENT DOCUMENTS

| | | | |
|---|---|---|---|
| 6,602,159 B1* | 8/2003 | Williams | B60K 17/3462 |
| | | | 180/247 |
| 7,189,179 B2 | 3/2007 | Williams et al. | |
| 7,694,598 B2 | 4/2010 | Kriebemegg et al. | |
| 8,092,334 B2 | 1/2012 | Peura et al. | |
| 2002/0042318 A1* | 4/2002 | Brown | B60K 17/3467 |
| | | | 475/204 |
| 2003/0078130 A1* | 4/2003 | Williams | B60K 17/3467 |
| | | | 475/204 |
| 2004/0220010 A1* | 11/2004 | Williams | B60K 17/3462 |
| | | | 475/198 |
| 2005/0121283 A1* | 6/2005 | Brissenden | B60K 23/0808 |
| | | | 192/85.63 |
| 2009/0250309 A1* | 10/2009 | Puiu | B60K 17/3467 |
| | | | 192/85.48 |
| 2010/0192724 A1* | 8/2010 | Mohan | B60K 17/3467 |
| | | | 74/665 F |
| 2011/0152026 A1* | 6/2011 | Williams | B60K 17/344 |
| | | | 475/86 |

* cited by examiner

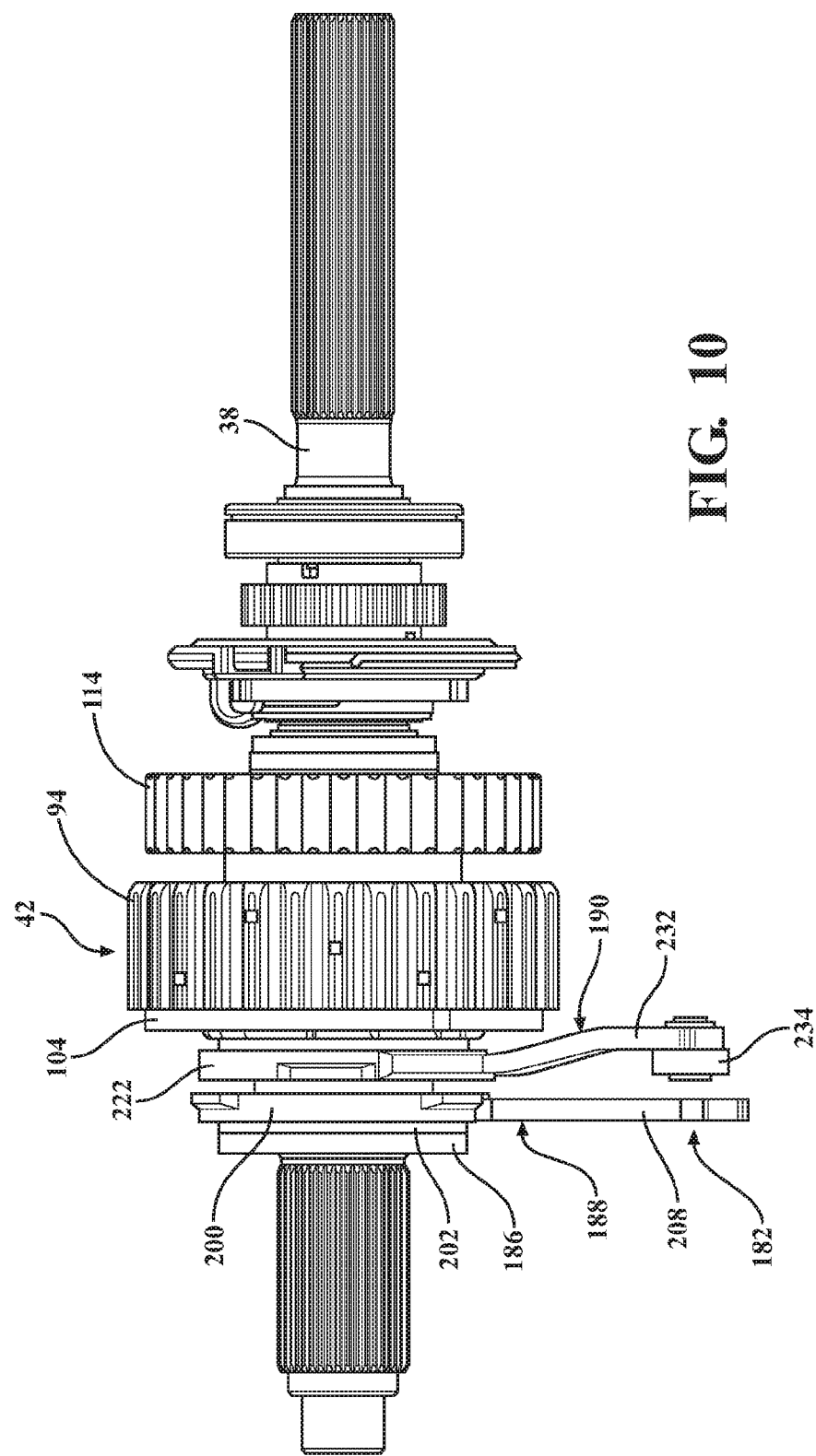

US 9,925,869 B2

TWO-SPEED TRANSFER CASE WITH NON-SYNCHRONIZED RANGE SHIFT MECHANISM AND ON-THE-MOVE RANGE SHIFT CONTROL SYSTEM

CROSS REFERENCE TO RELATED APPLICATIONS

This application claims the benefit of U.S. Provisional Patent Application Ser. No. 62/093,132 filed on Dec. 17, 2014, and titled "TWO-SPEED TRANSFER CASE WITH NON-SYNCHRONIZED RANGE SHIFT MECHANISM AND ON-THE-MOVE RANGE SHIFT CONTROL SYSTEM", the entire disclosure of which is hereby incorporated by reference.

FIELD

The present disclosure relates generally to two-speed transfer cases for use in four-wheel drive motor vehicles to establish high-range and low-range operating modes. More particularly, the present disclosure relates to a two-speed transfer case equipped with a non-synchronized range shift mechanism and a control system operable for selectively shifting the transfer case on-the-move from its low-range operating mode into its high-range operating mode under certain vehicular operating conditions.

BACKGROUND

This section provides background information related to the present disclosure which is not necessarily prior art.

The drivetrain in many light-duty and sport-utility vehicles includes a transfer case for transmitting drive torque from the engine and transmission to all four of the wheels, thereby establishing a four-wheel drive mode of operation. To accommodate differing road surfaces and conditions, many transfer cases are equipped with a range shift mechanism having a gear reduction unit and a dog-type range clutch which can be selectively shifted to establish four-wheel high-range and low-range drive modes. In many instances, however, the transfer case can not be shifted between its four-wheel high-range and low-range drive modes unless the vehicle is stopped and the transmission is in neutral. Unfortunately, the need to stop the vehicle prior to such "range" shifting is inconvenient, particularly upon encountering road conditions or surface terrains where continuation of the vehicle's rolling momentum would assist in overcoming the conditions encountered.

To alleviate this inconvenience, some range shift mechanisms are equipped with a synchronized range clutch which permits the vehicle operator to shift from the four-wheel low-range drive mode into the four-wheel high-range drive mode without stopping the vehicle. For example, U.S. Pat. No. 5,054,335 discloses a transfer case equipped with a synchronized range shift arrangement for "on-the-move" shifting of a layshaft-type gear reduction unit. Alternatively, commonly-owned U.S. Pat. No. 5,346,442 discloses a transfer case having a synchronized range shift arrangement for on-the-move shifting of a planetary-type gear reduction unit. In addition, commonly-owned U.S. Pat. No. 5,655,986 discloses a transfer case equipped with a planetary-type gear reduction unit which permits synchronized shifting into and out of the high-range drive mode and low-range drive mode.

In addition to the above-noted mechanically synchronized range shift system, it is also known to electronically control the drivetrain to provide on-the-move range shifting of transfer cases. For example, an electronically-shifted two-speed transfer case is disclosed in U.S. Pat. No. 5,522,777 as having a transfer case control module which receives input signals from the engine control module relating to the current transmission gear, engine speed and vehicle speed. The transfer case control module uses these input signals to generate control signals that are sent back to the engine control module for use in regulating vehicle operation to accommodate on-the-move range shifting. Specifically, the engine control module will control the engine fuel system to modify engine speed and/or shift the transmission gear to match the rotary speed of the transmission output to that of the transfer case output prior to actuation of the range shift mechanism. However, the requirement to integrate such a transfer case control system into the existing circuitry of conventional engine control modules may increase the complexity of the four-wheel drive system.

In view of the substantial interest in transfer cases equipped with one-the-move range shift systems, a recognized need exists to develop electronically-controlled range shift systems for use with four-wheel drive transfer cases that further advance the current technology.

SUMMARY

This section provides a general summary of the disclosure and is not intended to be a comprehensive disclosure of its full scope or all of its features, aspects, objectives and advantages.

It is an aspect of the present disclosure to provide a shift-on-the-move shift strategy and control system for a two-speed transfer case equipped with a non-synchronized range shift mechanism.

It is a related aspect to provide a four-wheel drive vehicle equipped with a two-speed transfer case having a non-synchronized range shift mechanism and a transfer case control unit operably communicating with one or more other vehicle control units to facilitate selective shifting from a low-range operating mode into a high-range operating mode and, more particularly, from a four-wheel low-range drive (4LO) mode into a four-wheel high-range drive (4HI) mode.

In accordance with another related aspect, the transfer case control unit is configured to only permit such an on-the-move range shift under specific vehicular operating conditions and further includes a recovery strategy to re-establish the four-wheel low-range drive mode in the event the range shift is unsuccessful.

These and other aspects of the present disclosure are directed to a four-wheel drive motor vehicle equipped with a two-speed transfer case operably arranged to transmit drive torque from the vehicle's powertrain to first and second drivelines. The transfer case includes a rotary input driven by the powertrain, a first rotary output drivingly connected to the first driveline, a second rotary output drivingly connected to the second driveline, and a torque transfer arrangement for selectively transmitting drive torque from the rotary input to at least one of the first and second rotary outputs. The torque transfer arrangement includes a mode clutch unit, a range clutch unit, and a power-operated clutch actuation unit. The mode clutch unit includes a mode clutch operably disposed between first and second rotary outputs and a mode clutch actuator for selectively shifting the mode clutch between a released or two-wheel drive (2WD) mode and an engaged or four-wheel drive (4WD) mode. The range clutch unit includes a reduction gearset driven by the rotary input, a range clutch operably disposed between the reduction gearset and the first rotary output, and a range clutch actuator for selectively moving the range clutch between a first or high (HI) range position, a second or neutral (N) range position, and a third or low (LO) range position. A first or direct ratio drive connection is established between the rotary input and the first rotary output when the range clutch is located in its (HI) range position while a second or reduced ratio drive connection is established when the range clutch is located in its (LO) range position. The power-operated clutch actuation unit is configured to control operation of the mode clutch actuator and the range clutch actuator. A transfer case control system is also provided for controlling actuation of the power-operated clutch actuation unit. The transfer case control system is operable to execute a range shift control strategy configured to facilitate on-the-move range shifting of the transfer case from a four-wheel low-range (4LO) drive mode into a four-wheel high-range (4HI) drive mode. The transfer case control system includes a transfer case control unit (TCCU) and vehicle sensors configured and arranged to detect various operating parameters of the motor vehicle. The TCCU is configured to receive input signals from the sensors and communicate with a transmission control unit (TCU) to selectively control operation of the range clutch actuator as part of the on-the-move range shift control strategy.

As a further feature of the present disclosure, the reduction gearset is a planetary gearset and the range clutch is a range collar that is moveable via actuation of a power-operated range clutch actuator for selectively coupling components of the planetary gearset to the first rotary output to establish the first and second ratio drive connections.

According to another aspect of the disclosure, a transfer case is provided that includes an input shaft, first and second output shafts and a reduction gearset driven by the input shaft. A range clutch is operable in a first range position to establish a drive connection between the input shaft and the first output shaft. The range clutch is further operable in a second range position to establish a drive connection between the reduction gearset and the first output shaft. A mode clutch is operable in a first mode position to disengage the second output shaft from driven engagement with the first output shaft, and further operable in a second mode position to establish a drive connection between the first output shaft and the second output shaft. A power-operated clutch actuation unit is also provided that has an electric motor that drives an actuator shaft. A range actuator is driven by the actuator shaft for moving the range clutch between its first and second range positions, and a mode actuator is driven by the actuator shaft for moving the mode clutch between its first and second mode positions. Further, a control system actuates the electric motor to control the magnitude and direction of rotation of the actuator shaft so as to coordinate movement of the range clutch and the mode clutch, wherein the control system includes a transfer case control unit adapted to communicate with vehicle sensors and at least one other vehicle control unit. The control system is operable to permit on the move shifting of the range clutch from its second range position to its first range position following speed synchronization of the input shaft and the first output shaft.

According to yet another aspect of the disclosure, a transfer case is provided that includes an input shaft, first and second output shafts, and a reduction gearset that is driven by the input shaft and has an output component that is driven at a reduced speed relative to the input shaft. A dog clutch is operable in a first range position to couple the input shaft to the first output shaft for establishing a high-range drive connection. The dog clutch is further operable in a second range position to couple the output component of the reduction gearset to the first output shaft for establishing a low-range drive connection. A mode clutch that includes a clutch pack is operably disposed between the first and second output shafts. The mode clutch also includes a pressure plate that is moveable between a first mode position whereat a minimum clutch engagement force is exerted on the clutch pack, and a second mode position whereat a maximum clutch engagement force is exerted on the clutch pack. An actuation mechanism is also provided that includes a motor driving an actuator shaft. A range actuator is driven by the actuator shaft for moving the dog clutch between its first and second range positions, and a mode actuator is driven by the actuator shaft for moving the pressure plate between its first and second mode positions. The actuator shaft is rotatable through three distinct ranges of rotary travel for causing the range actuator and the mode actuator to coordinate movement of the dog clutch and the pressure plate. A control system is also provided for controlling actuation of the motor so as to coordinate actuation of the dog clutch and the mode clutch. The control system includes a transfer case control unit adapted to communicate with vehicle sensors and a transmission control unit for moving the dog clutch from its second range position to its first range position following speed synchronization between a transmission output shaft and the first output shaft.

A method for controlling on-the-move range shifting of a four-wheel drive vehicle is also provided. The method includes providing a powertrain for generating drive torque. The powertrain includes a multi-gear transmission that has a transmission output shaft. The method also includes providing a rear driveline and a front driveline. The method continues with providing a transfer case that comprises an input shaft that is connected to the transmission output shaft, a rear output shaft that is connected to the rear driveline, a front output shaft that is connected to the front driveline, and a reduction unit that is driven by the input shaft. The transfer case also includes a range clutch that is operable in a first range position to drivingly couple the rear output shaft to the input shaft, a second range position to drivingly couple the rear output shaft to the reduction unit, and a third range position to uncouple the rear output shaft from the input shaft and the reduction unit. The transfer case further includes a mode clutch that is operable for selectively coupling the front output shaft to the rear output shaft. Further, the transfer case includes a power-operated clutch actuation unit that has a range clutch actuator operable for controlling actuation of the mode clutch. The method proceeds by providing a transmission control unit (TCU) operable for controlling operation of the transmission. The method continues by providing a transfer case control unit (TCCU) that is operable for controlling actuation of the power-operated clutch actuation unit, wherein the TCCU communicates with the TCU. The method also includes shifting the transmission into a Neutral non-driven mode. The method proceeds by providing a mode shift signal to the TCCU indicative of a driver request to shift the transfer case from a low-range mode into a high-range mode. The method then continues by determining whether a vehicle speed of the motor vehicle exceeds a threshold vehicle speed value and whether a rotary speed of the rear output shaft exceeds a threshold shaft speed value, and providing a vehicle speed signal and a shaft speed signal to the TCCU. Further, the method includes causing the TCCU to control the clutch actuation unit and actuate the range clutch actuator to move the range clutch from its second range position into its third range position when the vehicle speed signal indicates the vehicle speed exceeds the threshold vehicle speed value and the shaft speed signal indicates the rear output shaft speed exceeds the threshold shaft speed value. Additionally, the method includes causing the TCU to shift the transmission into a driven mode for synchronizing the rotary speeds of the transmission output shaft and the rear output shaft to a predetermined differential value and subsequently shifting the transmission back into its Neutral mode when a rotary speed differential between the transmission output shaft and the rear output shaft is less than the predetermined differential value. Additionally, the method includes causing the TCCU to control the clutch actuation unit and actuate the range clutch actuator to move the range clutch from its third range position into its first range position. Finally, the method includes causing the TCU to shift the transmission into its driven mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations such that the drawings are not intended to limit the scope of the present disclosure.

FIG. 10 is a side view of the rear output shaft equipped with a ballramp unit associated with the power-operated clutch actuation mechanism;

DETAILED DESCRIPTION

Example embodiments are hereafter provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The present disclosure is generally directed to a two-speed transfer case equipped with a torque transfer arrangement having a reduction gearset, a range clutch, and a range clutch actuator together defining a range clutch unit capable of being shifted during motive operative of the motor vehicle (i.e., "on-the-move" range shifting) from a first speed ratio operating mode into a second speed ratio operating mode. A transfer case control system is also provided which communicates with vehicle sensors and other vehicle control systems and functions to control operation of the range clutch actuator for moving the range clutch from a low-range position into a high-range position to provide on-the-move range shifting between a four-wheel low-range (4LO) drive mode and a four-wheel high-range (4HI) drive mode. The particular construction and type of reduction gearset, range clutch and range clutch actuator shown and described is merely intended to be representative of any suitable non-synchronized range shift system adapted for use with a two-speed transfer case and to which the present teachings are applicable. Likewise, the specific construction and type of mode clutch unit and power-operated clutch actuation unit associated with the torque transfer arrangement is merely intended to be representative of any suitable mode shift system capable of shifting the transfer case between a two-wheel drive (2WD) mode and a four-wheel drive (4WD) mode. In addition, the "integrated" power-operated clutch actuation system disclosed can be replaced with other types of combined or individual power-operated (i.e., hydraulic, electromagnetic, electro-mechanical) clutch actuators or manually-operated (i.e., gearshift lever) clutch actuators.

Figure 1:
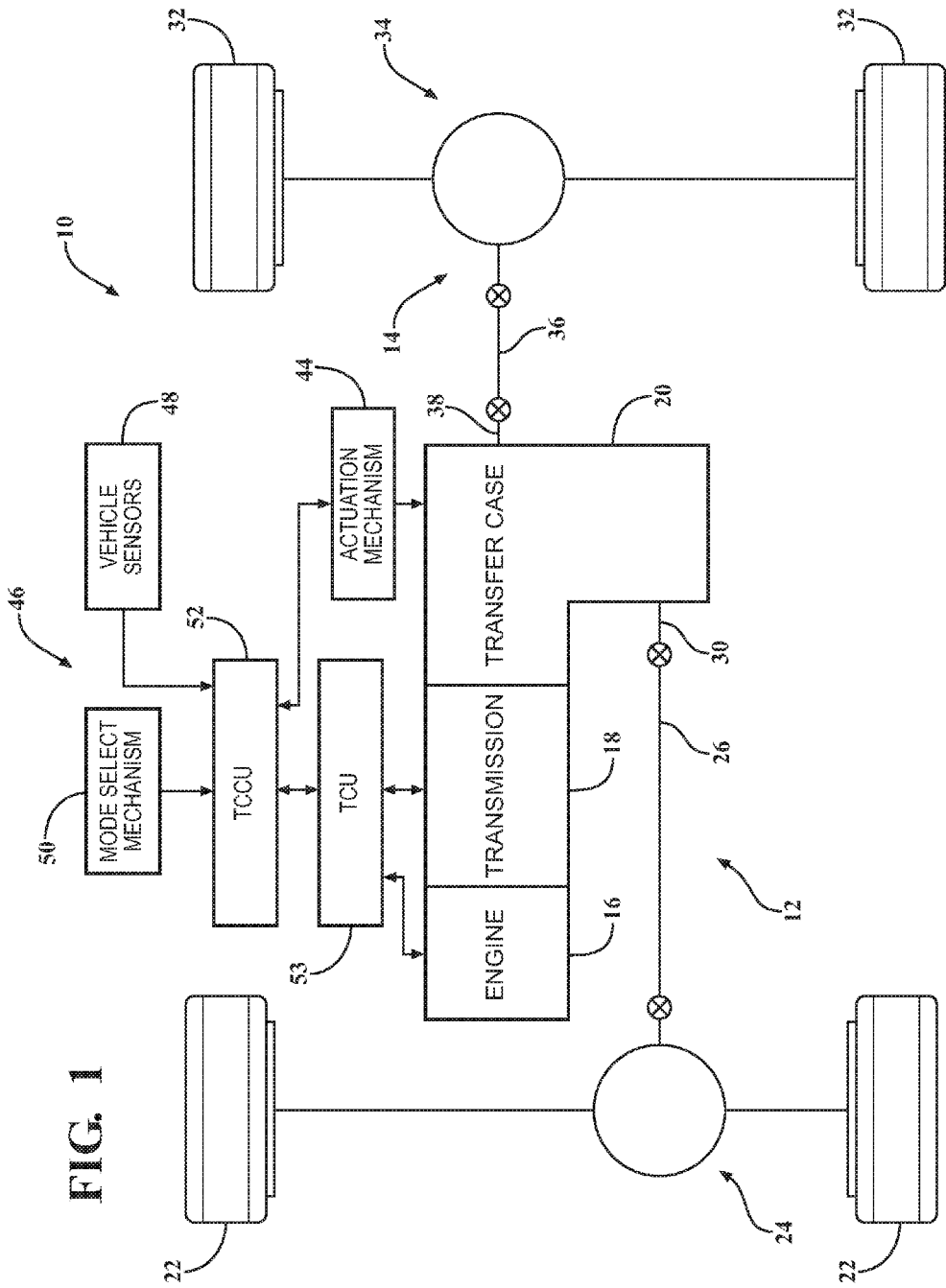
FIG. 1 is a diagrammatical illustration of an example four-wheel drive vehicle equipped with a transfer case and transfer case control system according to the teachings of the present disclosure.

Referring now to FIG. 1 of the drawings, a four-wheel drive vehicle 10 is schematically shown to include a front driveline 12, a rear driveline 14 and a powertrain for generating and selectively delivering rotary tractive power (i.e., drive torque) to the drivelines. The powertrain is shown to include an engine 16 and a transmission 18 which may be of either the manual or automatic type. Transmission 18 is preferably a multi-ratio gear assembly having a transmission input driven by engine 16 and a transmission output capable of being driven at a plurality of gear ratios relative to the transmission input. In the particular embodiment shown, vehicle 10 further includes a transfer case 20 for transmitting drive torque from the powertrain to front driveline 12 and rear driveline 14. Front driveline 12 includes a pair of front wheels 22 connected via a front axle assembly 24 and a front propshaft 26 to a front output shaft 30 of transfer case 20. Similarly, rear driveline 14 includes a pair of rear wheels 32 connected via a rear axle assembly 34 and a rear propshaft 36 to a rear output shaft 38 of transfer case 20.

As will be further detailed, transfer case 20 is equipped with a torque transfer arrangement including a two-speed range clutch unit 40, a mode clutch unit 42 and a power-operated clutch actuation unit 44 that is operable to control coordinated shifting of range clutch unit 40 and adaptive engagement of mode clutch unit 42. In addition, a control system 46 is provided for controlling actuation of clutch actuation unit 44. Control system 46 includes vehicle sensors 48 for detecting real time operational characteristics of motor vehicle 10, a mode select mechanism 50 for permitting the vehicle operator to select one of the available drive modes, and a transfer case control unit (TCCU) 52 that is operable to generate electric control signals in response to input signals from sensors 48 and mode signals from mode select mechanism 50. As also diagrammatically shown, TCCU 52 is adapted to communicate with at least one other vehicle control unit such as, for example, a transmission control unit (TCU) 53.

Transfer case 20 is shown to include a rotary input member, such as an input shaft 54, that is adapted to be coupled for driven connection with the output shaft of transmission 18. Input shaft 54 is supported in a housing 56 by a bearing assembly 58 for rotation about a first rotary axis. A first rotary output, such as a mainshaft or rear output shaft 38, is supported between input shaft 54 and housing 56 for rotation about the first rotary axis via a pair of laterally-spaced bearing assemblies 60 and 62. In addition, a second rotary output, such as front output shaft 30, is supported in housing 56 for rotation about a second rotary axis by a pair of bearing assemblies 64 and 66.

Figure 2:
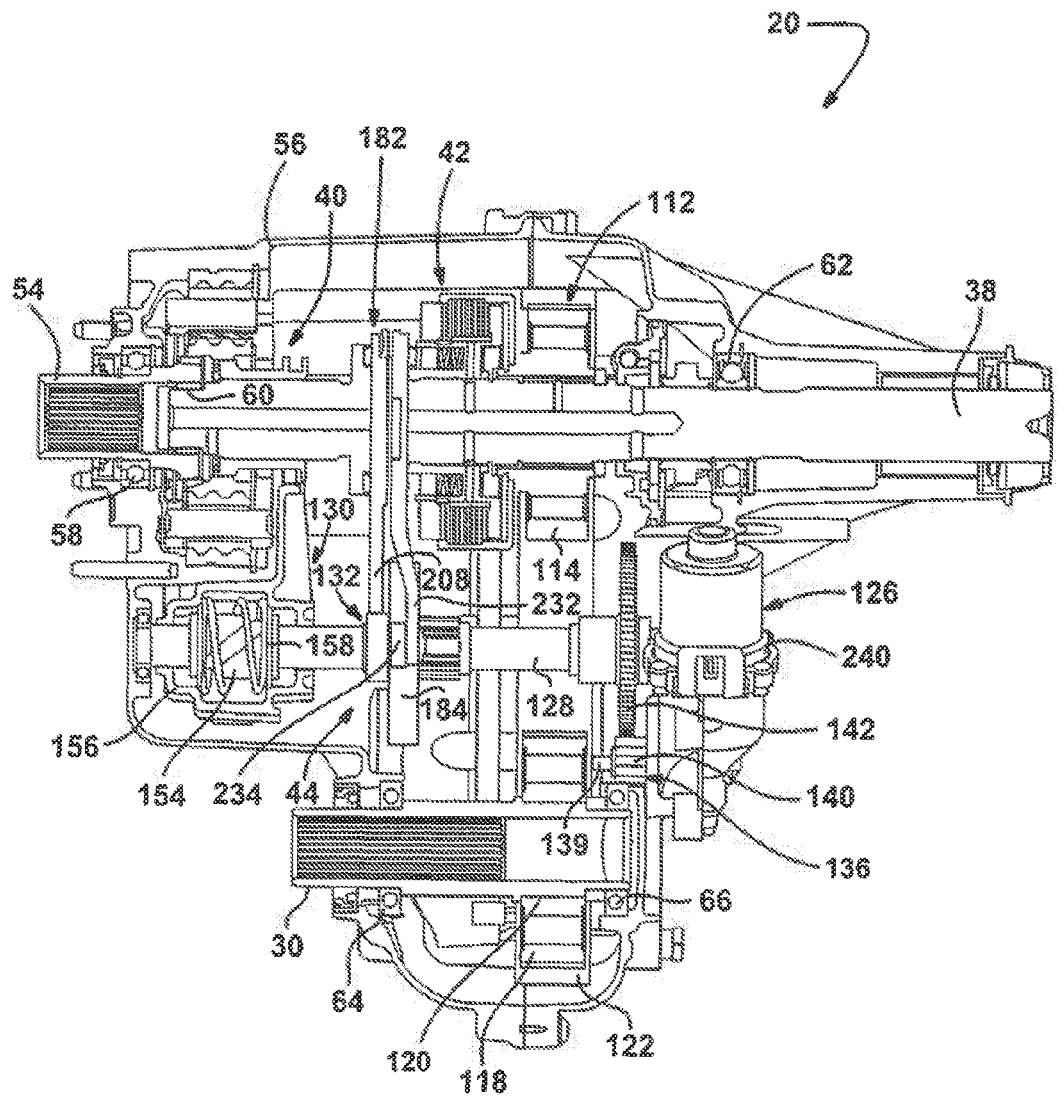
FIGS. 2 and 3 are sectional views of an example transfer case equipped with a torque transfer arrangement having a range clutch unit, a mode clutch unit, and a power-operated clutch actuation unit.
Figure 3:
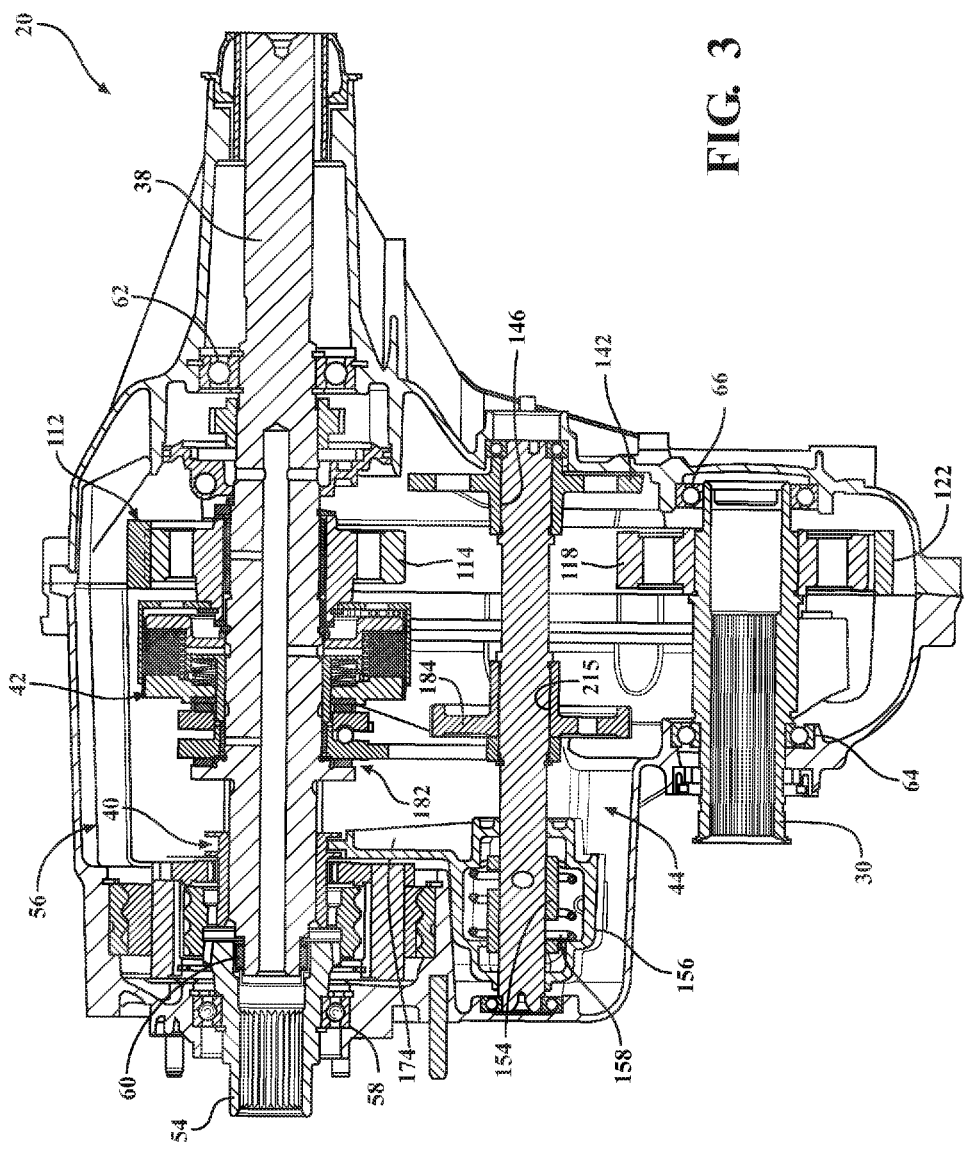
Figure 4:
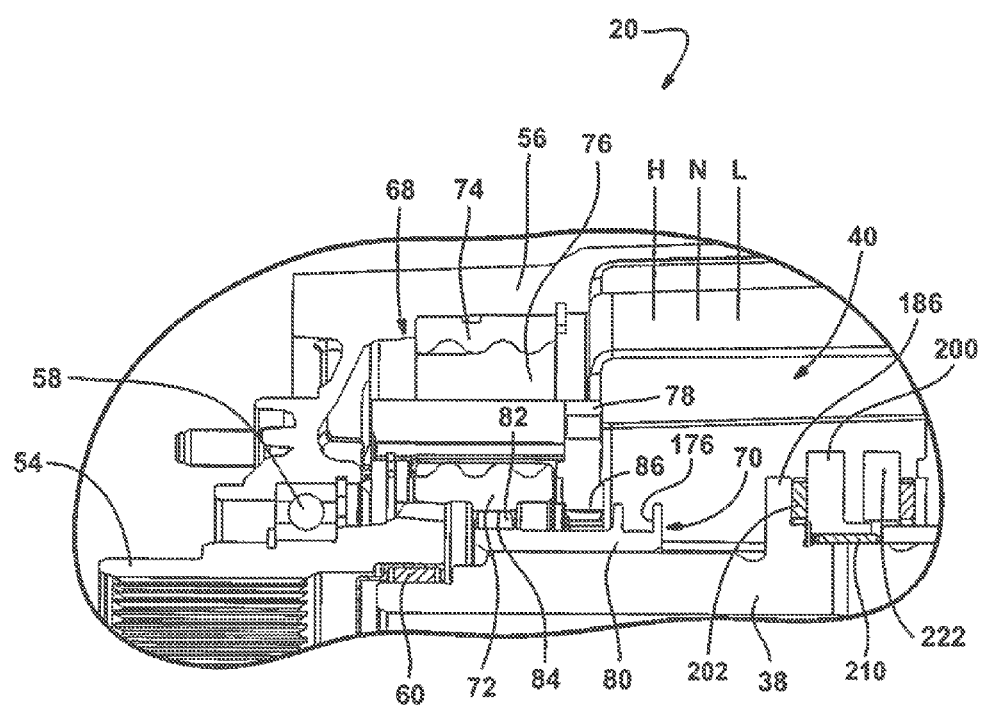
FIG. 4 is an enlarged partial view of various components associated with the range clutch unit of the transfer case shown in FIGS. 2 and 3.

As best seen from FIGS. 2 through 4, range clutch unit 40 is shown to generally include a reduction gearset 68 and a range clutch 70. Reduction gearset is shown as a planetary gearset 68 having a sun gear 72 directly driven by input shaft 54, a ring gear 74 non-rotatably fixed to housing 56, and a plurality of planet gears 76 rotatably supported from a planet carrier 78. As seen, planet gears 76 are meshed with both sun gear 72 and ring gear 74. Planetary gearset 68 functions to drive planet carrier 78 at a reduced speed relative to input shaft 54. In one preferred but non-limiting example, a 2.72 to 1.0 reduction ratio is provided by planetary gearset 68.

Range clutch 70 includes a shift collar 80 coupled via a spline connection for rotation with and axial sliding movement on rear output shaft 38. Shift collar 80 has external clutch teeth 82 adapted to selectively engage either internal clutch teeth 84 formed on input shaft 54 or internal clutch teeth 86 formed on planet carrier 78. Shift collar 80 is shown located in a high (HI) range position such that its clutch teeth 82 are engaged with clutch teeth 84 on input shaft 54. As such, a direct speed ratio or "high-range" drive connection is established between input shaft 54 and rear output shaft 38. Shift collar 80 is axially moveable on rear output shaft 38 from its (HI) range position through a central neutral (N) range position into a low (LO) range position. Location of shift collar 80 in its (N) range position functions to disengage its clutch teeth 82 from both input shaft clutch teeth 84 and carrier clutch teeth 86, thereby uncoupling rear output shaft 38 from driven connection with input shaft 54. In contrast, movement of shift collar 80 into its (LO) range position causes its clutch teeth 82 to engage clutch teeth 86 on planet carrier 78, thereby establishing the reduced speed ratio or "low-range" drive connection between input shaft 54 and rear output shaft 38.

It will be appreciated that planetary gearset 68 and non-synchronized range clutch 70 function to provide transfer case 20 with a two-speed (i.e., high-range and low-range) feature. As will be detailed, the non-synchronized range clutch unit 40 disclosed can be selectively controlled to permit "on-the-move" range shifting between the low-range and high-range drive modes without the need to stop the motor vehicle. Furthermore, any two-speed reduction gearset associated with a moveable range shift member to establish first and second ratio drive connections between input shaft 54 and rear output shaft 38 is considered to be within the scope of this invention.

Figure 5:
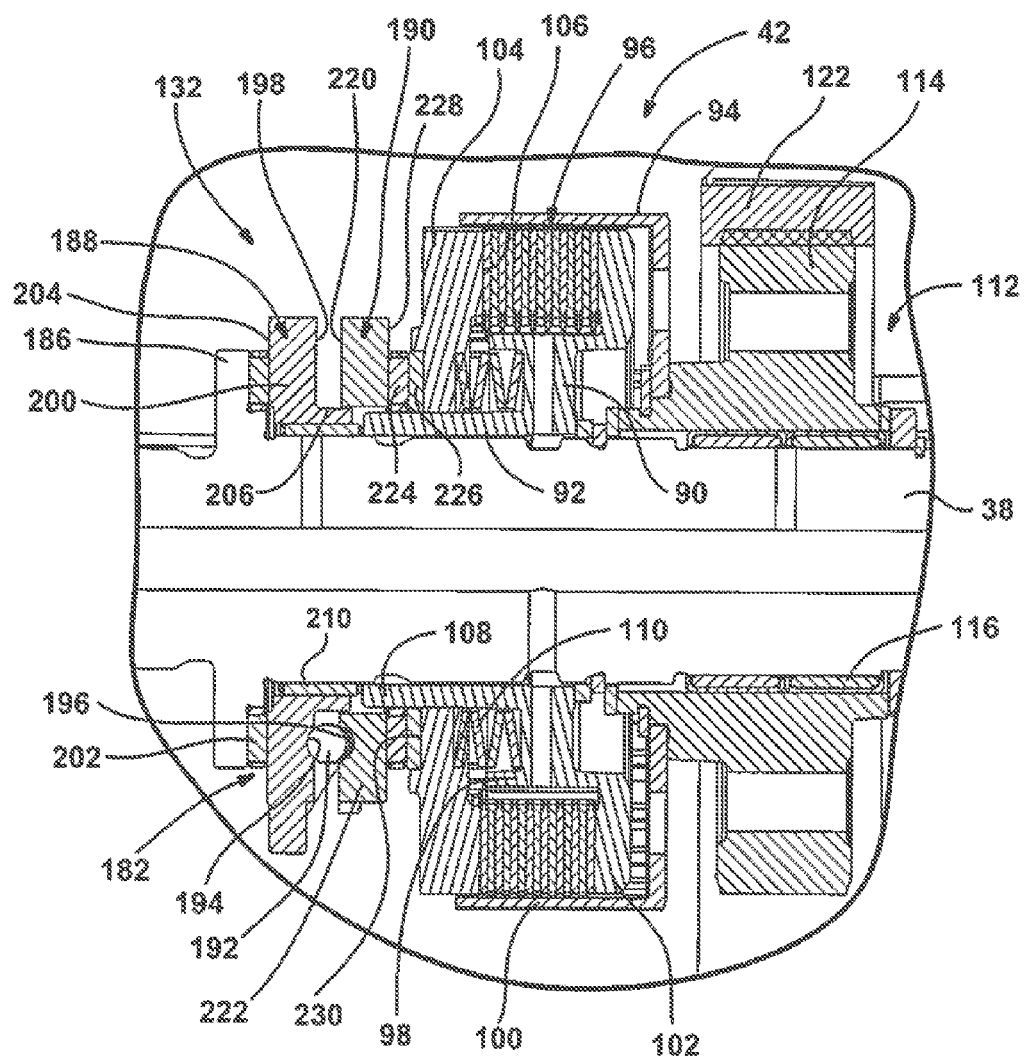
FIG. 5 is an enlarged partial view of various components associated with the mode clutch unit of the transfer case shown in FIGS. 2 and 3.

Referring primarily to FIG. 5, mode clutch unit 42 is shown to include a mode clutch 88 having a clutch hub 90 fixed via a spline connection 92 for rotation with rear output shaft 38, a clutch drum 94, and a multi-plate clutch pack 96 operably disposed between clutch hub 90 and clutch drum 94. As seen, clutch pack 96 includes a set of inner clutch plates splined to a cylindrical rim segment 98 of clutch hub 90 and which are alternately interleaved with a set of outer clutch plates splined to a cylindrical rim segment 100 of clutch drum 94. Clutch pack 96 is retained for limited sliding movement between a reaction plate segment 102 of clutch hub 90 and a pressure plate 104. Pressure plate 104 has a face surface 106 adapted to engage and apply a compressive clutch engagement force on clutch pack 96. Pressure plate 104 is splined to rim segment 98 for common rotation with clutch hub 90 and is further supported for sliding movement on a tubular sleeve segment 108 of clutch hub 90. A return spring 110 is provided between clutch hub 90 and pressure plate 104 for normally biasing pressure plate 104 away from engagement with clutch pack 96.

Upon engagement of mode clutch 88, drive torque is transmitted from rear output shaft 38 through clutch pack 96 and a transfer assembly 112 to front output shaft 30. Transfer assembly 112 is a chain drive unit shown to include a first sprocket 114 rotatably supported by bearing assemblies 116 on rear output shaft 38, a second sprocket 118 fixed via a spline connection 120 to front output shaft 30, and a power chain 122 encircling first sprocket 114 and second sprocket 118. Clutch drum 94 is fixed for rotation with first sprocket 114 such that drive torque transferred through mode clutch 88 is transmitted through transfer assembly 112 to front output shaft 30. Accordingly, transfer assembly 112 forms part of the torque transfer arrangement of transfer case 20.

Pressure plate 104 is axially moveable relative to clutch pack 96 between a first or "fully released" position and a second or "fully engaged" position. With pressure plate 104 in its fully released position, a minimum clutch engagement force is exerted on clutch pack 96 such that virtually no drive torque is transferred through mode clutch 88 so as to establish the two-wheel drive (2WD) mode. Return spring 110 is arranged to normally urge pressure plate 104 toward its fully released position. In contrast, location of pressure plate 104 in its fully engaged position causes a maximum clutch engagement force to be applied to clutch pack 96 such that front output shaft 30 is, in effect, coupled via transfer assembly 112 for common rotation with rear output shaft 38 so as to establish a locked or "part-time" four-wheel drive (4WD) mode. Therefore, accurate control of the position of pressure plate 104 between its fully released and fully engaged positions permits adaptive regulation of the amount of torque transfer between rear output shaft 38 and front output shaft 30, thereby permitting establishment of an adaptive or "on-demand" four-wheel drive (AUTO-4WD) mode.

Power-operated clutch actuation unit 44 is operable to coordinate movement of shift collar 80 between its three distinct range positions with movement of pressure plate 104 between its fully released and fully engaged positions. In its most basic form, clutch actuation unit 44 includes an electric motor 126, an actuator shaft 128 driven by electric motor 126, a range clutch actuator assembly 130 and a mode clutch actuator assembly 132. Actuator shaft 128 has its opposite ends supported by a pair of laterally-spaced bearing assemblies 134 for rotation in housing 56 about a third rotary axis. A reduction geartrain 136 provides a drive connection between a rotary output of electric motor 126 and actuator shaft 128. Reduction geartrain 136 includes a worm gearset (not shown) that is driven by the rotary output of electric motor 126 and a spur gearset 138. Actuation of electric motor 126 causes the worm gearset to drive a drive gear 140 associated with gearset 138. Specifically, drive gear 140 is a small diameter gear supported for rotation on an idler shaft 139 and which is meshed with a large diameter driven gear 142 fixed for rotation with actuation shaft 128. In particular, driven gear 142 includes a tubular hub segment 144 that is fixed via a spline connection 146 to actuator shaft 128 between a radial shaft flange 148 and rear bearing assembly 134. The cumulative reduction ratio provided by geartrain 136 permits the use of a smaller, low power electric motor. An angular position sensor or encoder 150 is mounted to an end portion of actuator shaft 128 for providing TCCU 52 with an input signal indicative of the angular position of actuator shaft 128.

Figure 6:
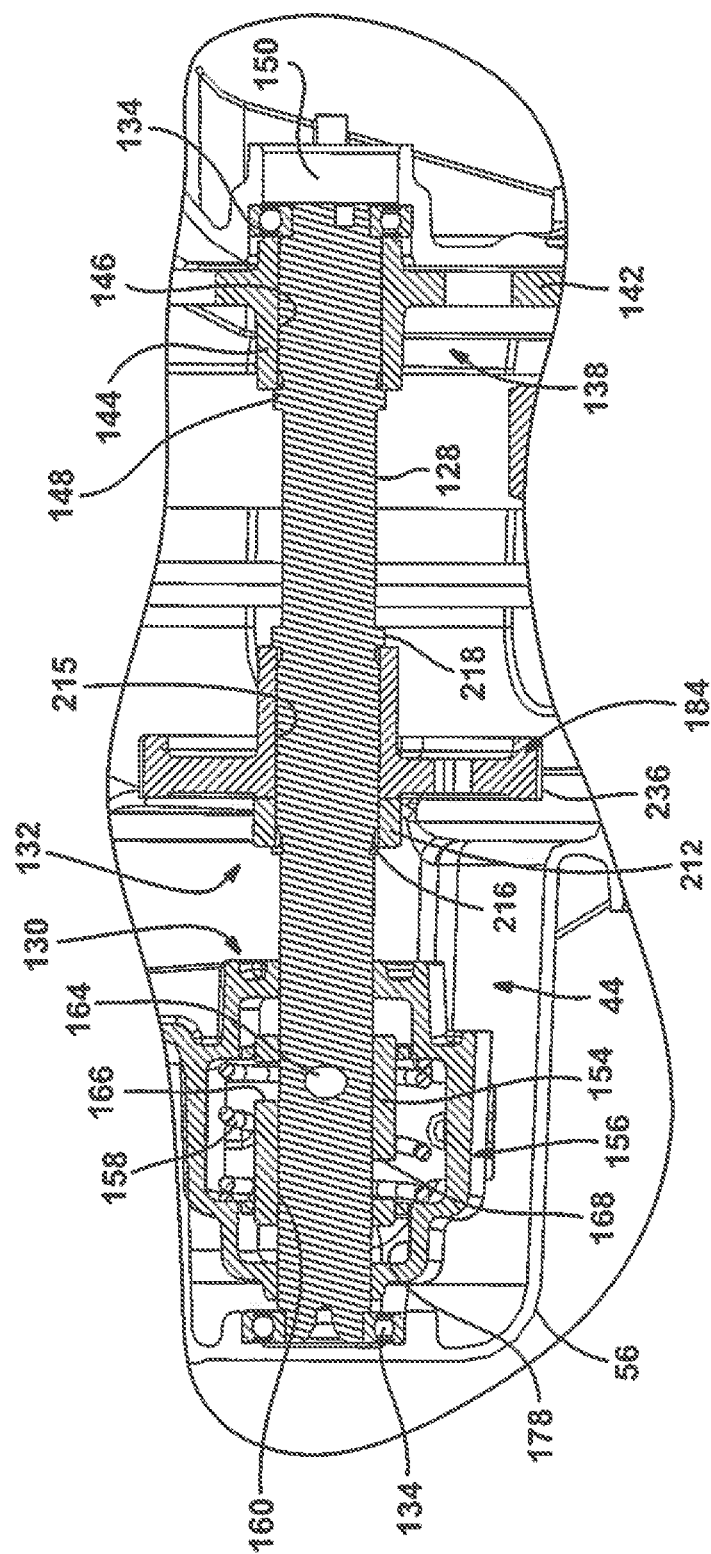
FIG. 6 is an enlarged partial view of various components associated with the clutch actuation unit of the transfer case shown in FIGS. 2 and 3.
Figure 7:
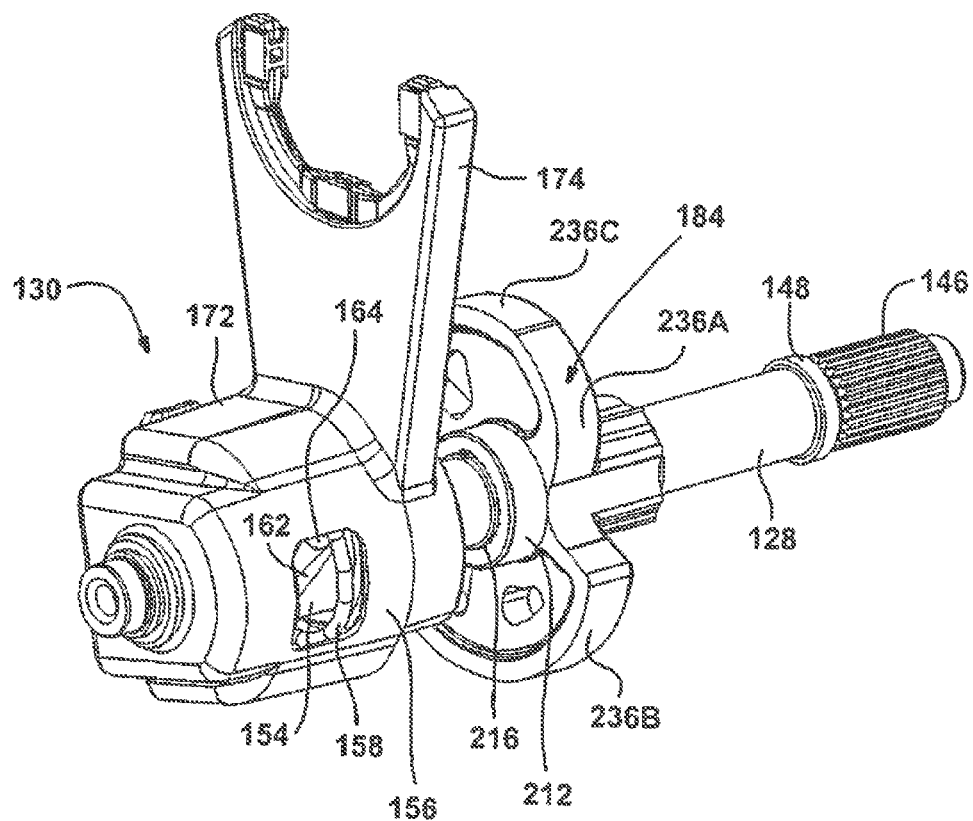
FIGS. 7 and 8 are views of an actuator shaft assembly associated with the power-operated clutch actuation unit.
Figure 8:
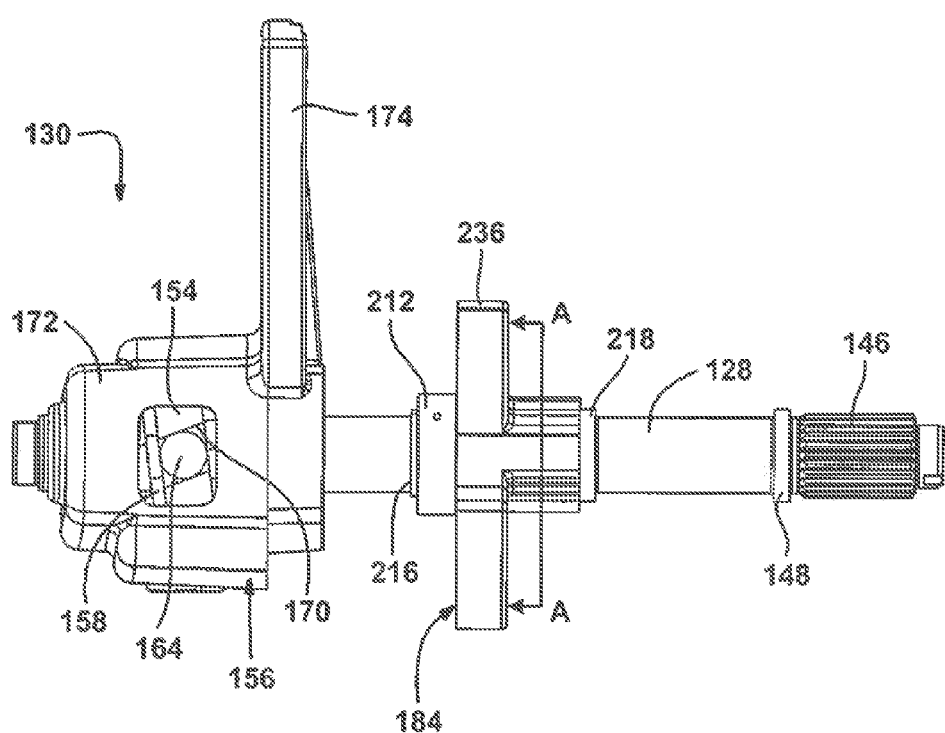

Range clutch actuator assembly 130 is operable to convert bi-directional rotary motion of actuator shaft 128 into bi-directional translational movement of shift collar 80 between its three distinct range positions. Referring primarily to FIGS. 6 through 8, range clutch actuator assembly 130 is shown to generally include a range cam 154, a range fork 156 and a spring-biasing unit 158. Range cam 154 is a tubular member having an inner diameter surface 160 journalled for sliding movement on actuator shaft 128. An elongated range slot 162 is formed in range cam 154 and receives a follower pin 164 that is fixed for rotation with actuator shaft 128. Slot 162 includes a high-range dwell segment 166, a low-range dwell segment 168 and a helical shift segment 170 interconnecting dwell segments 166 and 168. Range fork 156 includes a sleeve segment 172 supported for sliding movement on actuator shaft 128 and a fork segment 174 which extends from sleeve segment 172 into an annular groove 176 formed in shift collar 80. Sleeve segment 172 defines an interior chamber 178 within which range cam 154 and spring-biasing unit 158 are located. Spring-biasing unit 158 is operably disposed between range cam 154 and sleeve segment 172 of range fork 156. Spring-biasing unit 158 functions to urge range fork 156 to move axially in response to axial movement of range cam 154 while its spring compliance accommodates tooth "block" conditions that can occur between shift collar clutch teeth 82 and input shaft clutch teeth 84 or carrier clutch teeth 86. As such, spring-biasing unit 158 assures that range fork 156 will complete axial movement of shift collar 80 into its H and L range positions upon elimination of any such tooth block condition.

Range clutch actuator assembly 130 is arranged such that axial movement of range cam 154 results from movement of follower pin 164 within shift segment 170 of range slot 162 in response to rotation of actuator shaft 128. As noted, such movement of range cam 154 causes range fork 156 to move shift collar 80 between its three distinct range positions. Specifically, when it is desired to shift range clutch unit 40 into its high-range drive mode, electric motor 126 rotates actuator shaft 128 in a first direction which, in turn, causes concurrent rotation of follower pin 164. Such rotation causes follower pin 164 to move within shift segment 170 of range slot 162 for axially moving range cam 154 and range fork 156 until shift collar 80 is located in its H range position. With shift collar 80 in its H range position, the high-range drive connection is established between input shaft 54 and rear output shaft 38. Continued rotation of actuator shaft 128 in the first direction causes follower pin 164 to exit shift segment 170 of shift slot 162 and enter high-range dwell segment 166 for preventing further axial movement of range cam 154, thereby maintaining shift collar 80 in its H range position. As will be detailed, the length of high-range dwell segment 166 of range slot 162 is selected to permit sufficient additional rotation of actuator shaft 128 in the first rotary direction to accommodate actuation of mode clutch 88 by mode clutch actuator assembly 132.

With shift collar 80 in its H range position, subsequent rotation of actuator shaft 128 in the opposite or second direction causes follower pin 164 to exit high-range dwell segment 166 and re-enter helical shift segment 170 of range slot 162 for causing range cam 154 to begin moving shift collar 80 from its H range position toward its L range position. Upon continued rotation of actuator shaft 128 in the second direction, follower pin 164 exits shift segment 170 of range slot 162 and enters low-range dwell segment 168 for locating and maintaining shift collar 80 in its L range position, whereby the low-range drive connection between planet carrier 78 and rear output shaft 38 is established. Again, the length of low-range dwell segment 168 of range slot 162 is selected to permit additional rotation of actuator shaft 128 in the second rotary direction required to accommodate complete actuation of mode clutch 88.

Mode clutch actuator assembly 132 is operable to convert bi-directional rotary motion of actuator shaft 128 into bi-directional translational movement of pressure plate 104 between its fully released and fully engaged positions so as to permit adaptive regulation of the drive torque transferred through mode clutch 88 to front output shaft 30. In general, mode clutch actuator assembly 132 includes a ballramp unit 182 and a mode cam 184. Ballramp unit 182 is supported on rear output shaft 38 between a radial shaft flange 186 and pressure plate 104. Ballramp unit 182 includes a first cam member 188, a second cam member 190 and balls 192 disposed in aligned sets of tapered grooves 194 and 196 formed in corresponding face surfaces of cam members 188 and 190. In particular, grooves 194 are formed in a first face surface 198 on a cam ring segment 200 of first cam member 188. As seen, a thrust bearing assembly 202 is disposed between shaft flange 186 and a second face surface 204 of cam ring segment 200. First cam member 188 further includes a tubular sleeve segment 206 and an elongated lever segment 208. Sleeve segment 206 is supported on rear output shaft 38 via a bearing assembly 210. Lever segment 208 has a terminal end portion engaging a spacer collar 212 that is piloted on an and able to rotate relative to actuator shaft 128. Mode cam 184 is fixed via a spline connection 215 for common rotation with actuator shaft 128. A lock ring 216 axially locates spacer collar 212 and mode cam 184 relative to a radial shaft flange 218.

Second cam member 190 of ballramp unit 182 has its grooves 196 formed in a first face surface 220 of a cam ring segment 222 that is shown to generally surround portions of sleeve segment 206 of first cam member 188 and sleeve segment 108 of clutch hub 90. A thrust bearing assembly 224 and thrust ring 226 are disposed between a second face surface 228 of cam ring segment 222 and a face surface 230 of pressure plate 104. Second cam member 190 further includes an elongated lever segment 232 having a mode follower 234 mounted at its terminal end that rollingly engages a cam surface 236 formed on an outer peripheral edge of mode cam 184. As will be detailed, the contour of cam surface 236 on mode cam 184 functions to control angular movement of second cam member 190 relative to first cam member 188 in response to rotation of actuation shaft 128. Such relative angular movement between cam members 188 and 190 causes balls 192 to travel along tapered grooves 194 and 196 which, in turn, causes axial movement of second cam member 190. Such axial movement of second cam member 190 functions to cause corresponding axial movement of pressure plate 104 between its fully released and fully engaged positions, thereby controlling the magnitude of the clutch engagement force applied to clutch pack 96.

As seen, lever segment 232 of second cam member 190 is located on one side of actuator shaft 128 while lever segment 208 of first cam member 188 is located on the opposite side of actuator shaft 128. Due to engagement of mode follower 234 with cam surface 236 on mode cam 184, second cam member 190 is angularly moveable relative to first cam member 188 between a first or "retracted" position and a second or "extended" position in response to rotation of actuator shaft 128. With second cam member 190 rotated to its retracted position, return spring 110 biases pressure plate 104 to its fully released position which, in turn, urges balls 192 to be located in deep end portions of aligned grooves 194 and 196. Thus, such movement of second cam member 190 to its angularly retracted position relative to first cam member 188 also functions to locate second cam member 190 in an axially retracted position relative to clutch pack 96. While not shown, a biasing unit may be provided between lever segments 208 and 232 to assist return spring 110 in normally urging second cam member 190 toward its retracted position. In contrast, angular movement of second cam member 190 to its extended position causes balls 192 to be located in shallow end portions of aligned grooves 194 and 196 which causes axial movement of second cam member 190 to an axially extended position relative to clutch pack 96. Such axial movement of second cam member 190 causes pressure plate 104 to be moved to its fully engaged position in opposition to the biasing exerted thereon by return spring 110. Accordingly, control of angular movement of second cam member 190 between its retracted and extended positions functions to control concurrent movement of pressure plate 104 between its fully released and fully engaged positions.

As previously noted, cam surface 236 of mode cam 184 and range slot 162 of range cam 154 are configured to coordinate movement of shift collar 80 and pressure plate 104 in response to rotation of actuator shaft 128 for establishing a plurality of different drive modes. According to one possible arrangement, mode selector 50 could permit the vehicle operator to select from a number of different two-wheel and four-wheel drive modes including, for example, a two-wheel high-range drive (2WH) mode, an on-demand four-wheel high-range drive (AUTO-4H) mode, a part-time four-wheel high-range drive (4HI) mode, a Neutral (N) mode and a part-time four-wheel low-range drive (4LO) mode. Specifically, control system 46 functions to control the rotated position of actuator shaft 128 in response to the mode signal delivered to ECU 52 by mode selector 50 and the sensor input signals sent by sensors 48 to ECU 52.

Figure 9A:
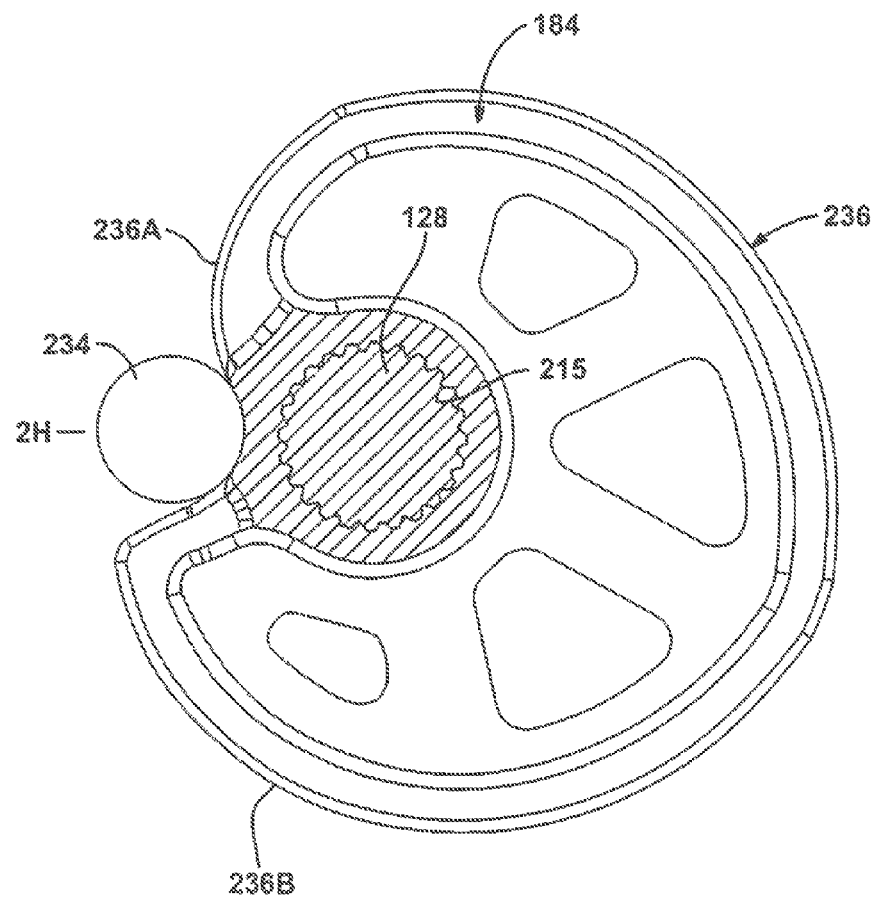
FIGS. 9A through 9F are sectional views taken generally along line A-A of FIG. 8 showing components associated with the power-operated clutch actuation unit positioned for establishing a number of different transfer case operating modes.

FIG. 9A illustrates actuator shaft 128 rotated to a "2H" position required to establish the two-wheel high-range drive (2WH) mode. As understood, the two-wheel high-range drive mode is established when shift collar 80 is located in its (HI) range position and pressure plate 104 is located in its fully released position relative to clutch pack 96. As such, input shaft 54 drives rear output shaft 38 at a direct speed ratio while mode clutch 88 is released such that all drive torque is delivered to rear driveline 14. Mode follower 234 is shown engaging a detent portion of a first cam segment 236A of cam surface 236 on mode cam 184 which functions to locate second cam member 190 in its retracted position.

Figure 9B:
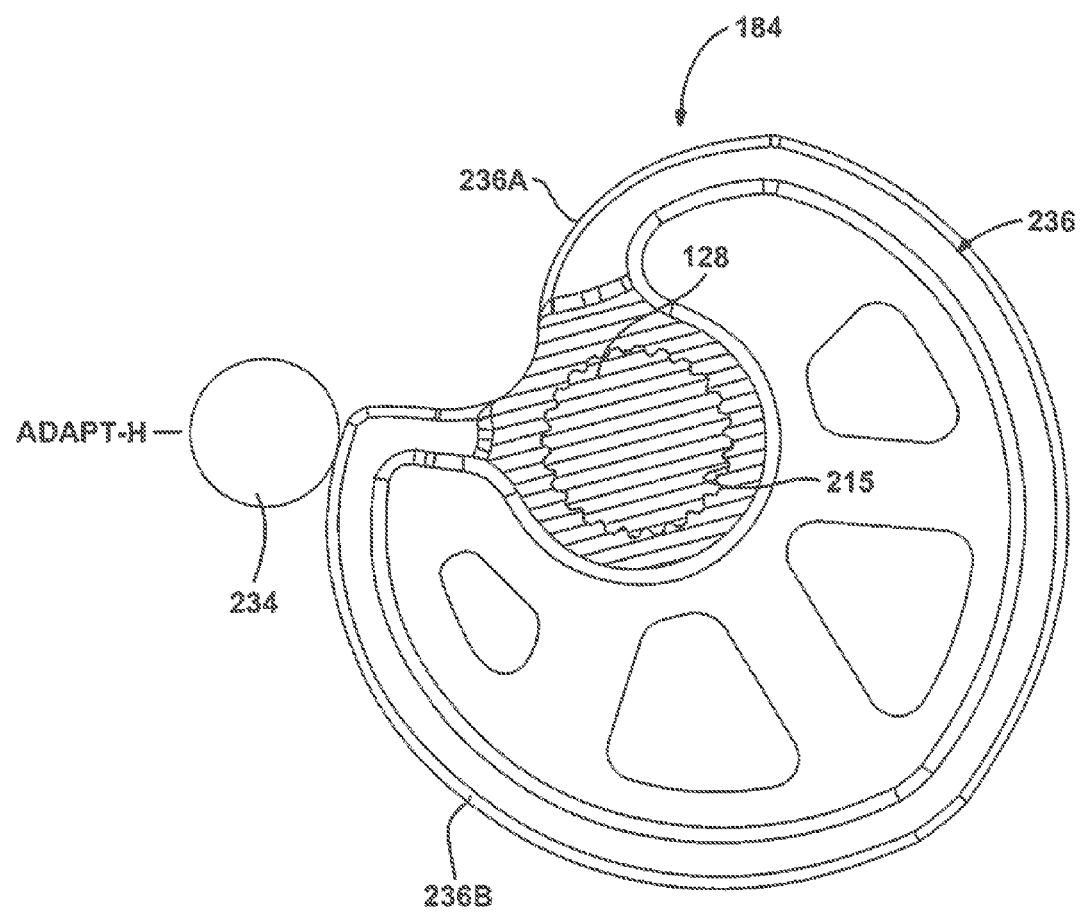

If the on-demand four-wheel high-range drive (AUTO-4H) mode is thereafter selected, electric motor 126 is energized to initially rotate actuator shaft 128 in a first (i.e., clockwise) direction from its 2H position to an "ADAPT-H" position shown in FIG. 9B. In this rotated position of actuator shaft 128, follower pin 164 is located within high-range dwell segment 166 of range slot 162 in range cam 154 such that shift collar 80 is maintained in its (HI) range position for maintaining the direct drive connection between input shaft 54 and rear output shaft 38. However, such rotation of actuator shaft 128 to its ADAPT-H position causes concurrent rotation of mode cam 184 to the position shown which, in turn, causes mode follower 234 to engage a first end portion of a second cam segment 236B of mode cam surface 236. Such movement of mode follower 234 from first cam segment 236A to second cam segment 236B causes second cam member 190 to move angularly relative to first cam member 188 from its retracted position to an intermediate or "ready" position. With second cam member 190 rotated to its ready position, ballramp unit 182 causes pressure plate 104 to move axially from its fully released position into an "adapt" position that is operable to apply a predetermined "preload" clutch engagement force on clutch pack 96. The adapt position of pressure plate 104 provides a low level of torque transfer across mode clutch 88 that is required to take-up clearances in clutch pack 96 in preparation for adaptive torque control. Thereafter, TCCU 52 determines when and how much drive torque needs to be transmitted across mode clutch 88 to limit driveline slip and improve traction based on the current tractive conditions and operating characteristics detected by sensors 48. As an alternative, the adapt position for pressure plate 104 can be selected to partially engage mode clutch 88 for establishing a desired front/rear torque distribution ratio (i.e., 10/90, 25/75, 40/60, etc.) between front output shaft 30 and rear output shaft 38.

Figure 9C:
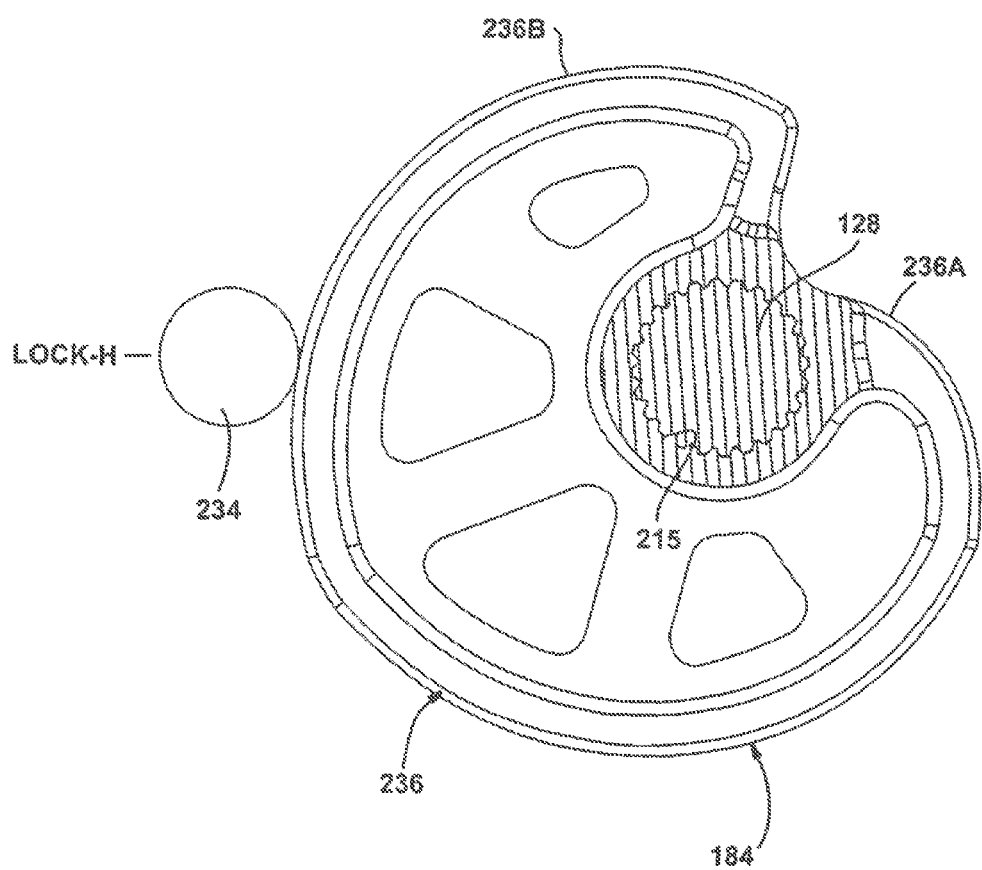

The limits of adaptive control in the on-demand four-wheel high-range drive mode are established by controlling bi-directional rotation of actuator shaft 128 between its ADAPT-H position of FIG. 9B and its "LOCK-H" position shown in FIG. 9C. With actuator shaft 128 in its LOCK-H position, second segment 236B of mode cam surface 236 causes second cam member 190 to move to its extended position, thereby causing pressure plate 104 to move to its fully engaged position for fully engaging mode clutch 88. This range of angular travel of actuator shaft 128 causes follower pin 164 to travel within high-range dwell segment 166 of range slot 162 so as to maintain shift collar 80 in its (HI) range position. However, such rotation of actuator shaft 128 results in mode follower 234 riding along second segment 236B of cam surface 236 which, in turn, is configured to control angular movement of second cam member 190 between its ready position and its extended position. Bi-directional rotation of actuator shaft 128 within this range of travel is controlled by TCCU 52 actuating electric motor 126 based on a pre-selected torque control strategy. As will be understood, any control strategy known in the art for adaptively controlling torque transfer across mode clutch 88 can be utilized with the present invention.

If the vehicle operator selects the part-time four-wheel high-range drive (4HI) mode, electric motor 126 is energized to rotate actuator shaft 128 in the first direction to its LOCK-H position shown in FIG. 9C. As such, shift collar 80 is maintained in its (HI) range position and mode cam 234 causes second cam member 190 to move to its extended position which, in turn, moves pressure plate 104 to its fully engaged position for fully engaging mode clutch 88. To limit the on-time service requirements of electric motor 126, a power-off brake 240 associated with electric motor 126 can be engaged to brake rotation of the motor output so as to prevent back-driving of geartrain 136 and for holding pressure plate 104 in its fully engaged position. In this manner, electric motor 126 can be shut-off after the part-time four-wheel high-range drive mode has been established.

Figure 9D:
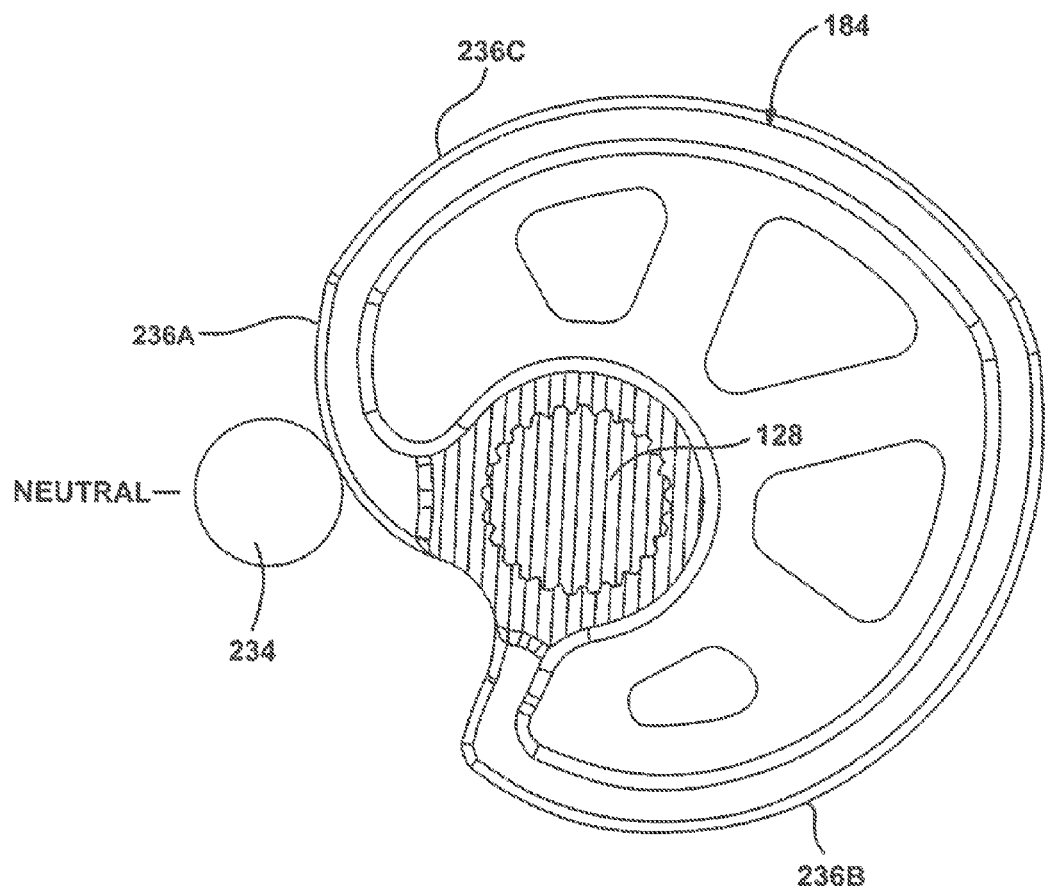

If the Neutral mode is selected, electric motor 126 is energized to rotate actuator shaft 128 in a second (i.e., counterclockwise) direction to the Neutral position shown in FIG. 9D. Such rotation of actuator shaft 128 causes follower pin 164 to exit high-range dwell segment 166 and ride within shift segment 170 of range slot 162 until shift collar 80 is located in its (N) position. Concurrently, rotation of mode cam 184 causes mode follower 234 to engage a portion of first segment 236A of cam surface 236 that is configured to move second cam member 190 to a position displaced from its retracted position. Such movement of second cam member 190 results in limited axial movement of pressure plate 104 from its fully released position toward clutch pack 96. Preferably, such movement of pressure plate 104 does not result in any drive torque being transferred through mode clutch 88 to front driveline 12.

Figure 9E:
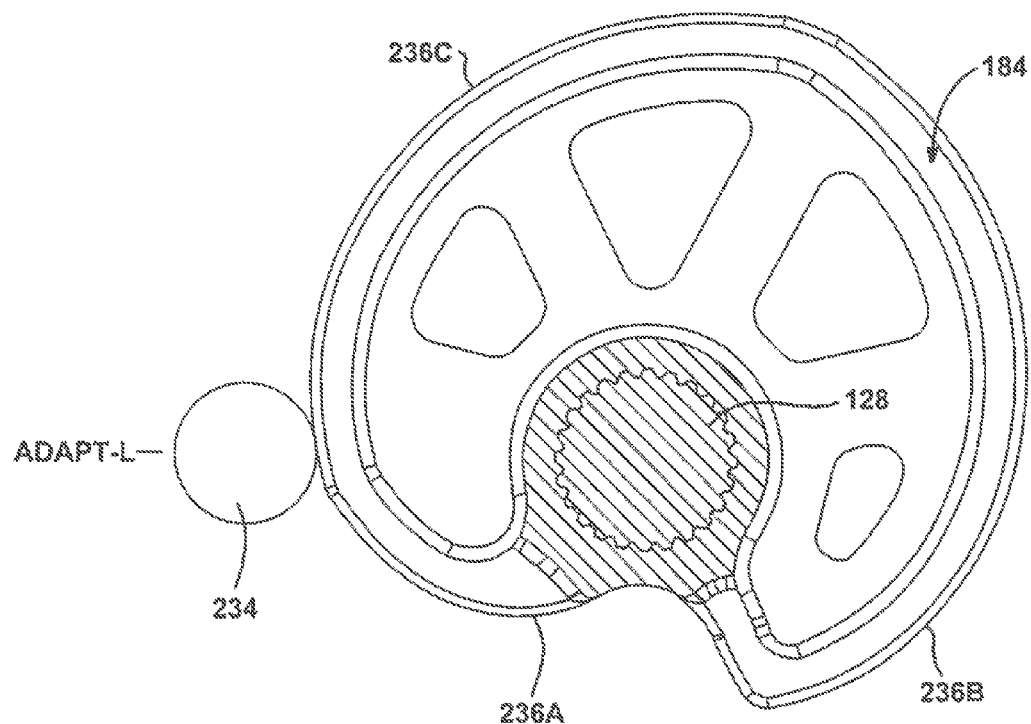
Figure 9F:
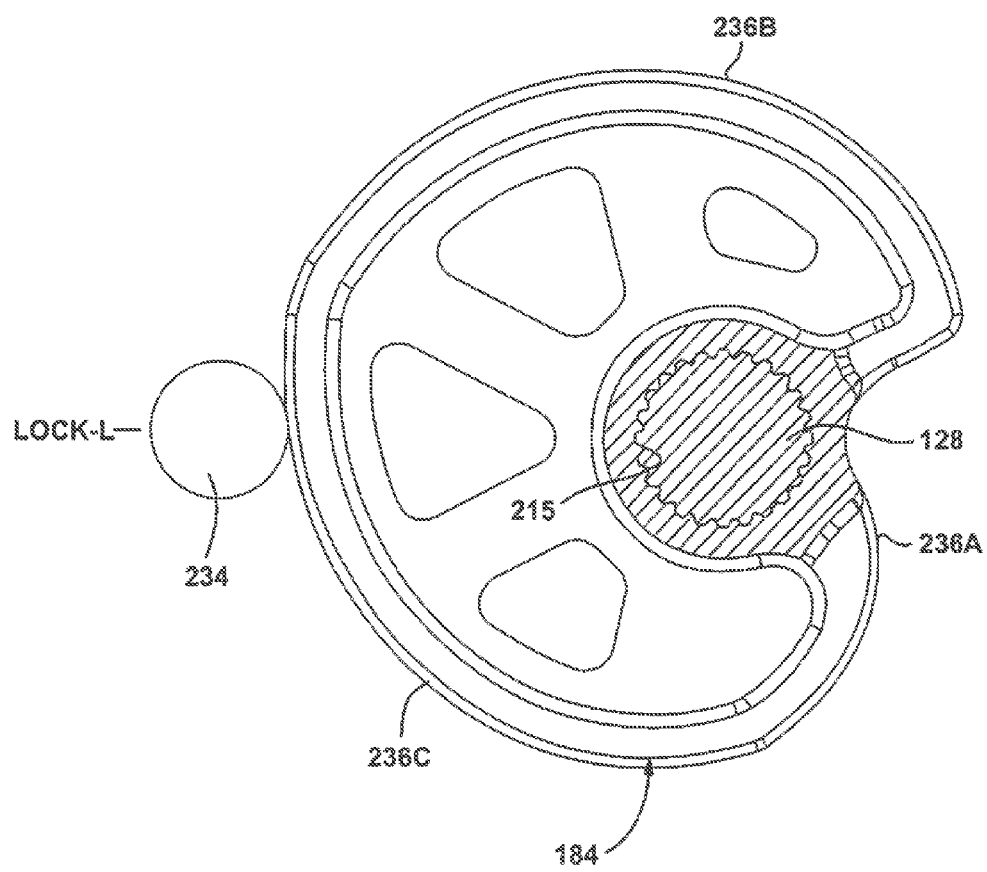

FIGS. 9E and 9F illustrate continued rotation of actuator shaft 128 in the second direction which occurs when the part-time four-wheel low-range drive (4LO) mode is selected. In particular, FIG. 9E shows an intermediate "ADAPT-L" position of actuator shaft 128 whereat range pin 164 enters low-range dwell segment 168 of range cam slot 162 for locating shift collar 80 in its (LO) range position. Mode cam 184 has likewise been rotated for locating mode follower 234 at the interface between first segment 236A of cam surface 236 and a third segment 236C thereof. The contour of third segment 236C is configured such that second cam member 190 will be rotated to its ready position when mode follower 234 is in the position shown. As previously noted, movement of second cam member 190 to its ready position causes pressure plate 104 to move axially to its adapt position. However, selection of the part-time four-wheel low-range drive mode causes continued rotation of actuator shaft 184 to its LOCK-L position shown in FIG. 9F. Low-range dwell segment 168 in range cam slot 162 maintains shift collar 80 in its L range position while third segment 236C of mode cam surface 236 causes mode follower 234 to move second cam member 190 to its extended position, thereby moving pressure plate 104 to its fully engaged position for fully engaging mode clutch 88. Again, power-off brake 240 can be actuated to maintain actuator shaft 128 in its LOCK-L position.

Based on the specific arrangement disclosed for power-operated clutch actuation unit 44, actuator shaft 128 is rotatable through a first range of angular travel to accommodate range shifting of shift collar 80 as well as second and third ranges of angular travel to accommodate engagement of mode clutch 88. In particular, the first range of angular travel for actuator shaft 128 is established between its ADAPT-H and ADAPT-L positions. The second range of travel for actuator shaft 128 is defined between its ADAPT-H and LOCK-H positions to permit adaptive control of mode clutch 88 with shift collar 80 in the (HI) range position. Likewise, the third range of actuator shaft travel is defined between its ADAPT-L and LOCK-L positions to permit actuation of mode clutch 88 while shift collar 80 is in its (LO) range position. In the construction shown, power-operated clutch actuation unit 44 utilizes a single powered device (i.e., electric motor 126) to control actuation of both range clutch actuator assembly 130 and mode clutch actuator assembly 132.

Figure 11:
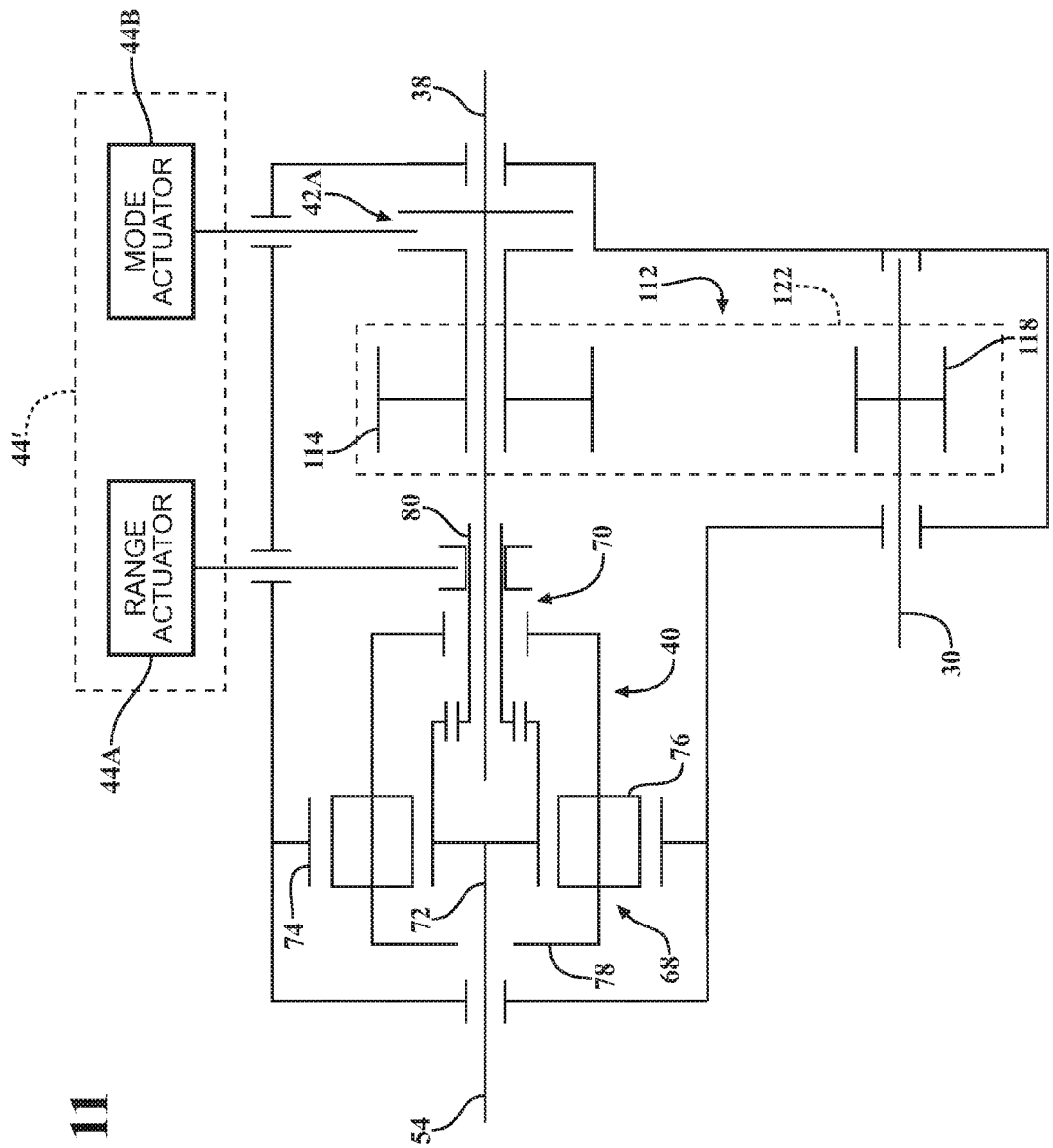
FIG. 11 is a schematic illustration of another two-speed transfer case constructed in accordance with the teachings of the present disclosure.

While FIGS. 2 through 10 provide a detailed description of one example transfer case 20, FIG. 11 is now provided to illustrate a schematic version of another example transfer case 20A. In general, transfer case 20A is substantially similar to transfer case 20 except that a separate range clutch actuator unit 44A and a separate mode clutch actuator unit 44B are shown associated with power-operated clutch actuation unit 44'. In addition, mode clutch unit 42A is schematically shown so as to encompass any type of suitable clutch arrangement including, for example and without limitation, a multi-plate friction clutch, a bi-directional overrunning clutch, an EM clutch, and synchronized or non-synchronized dog-type clutches, each of which is capable of selectively coupling first sprocket 114 to rear output shaft 38 to establish the 4WD mode.

The present disclosure relates to a control strategy configured to permit "on-the-move" range shifting of transfer case 20, 20A under certain vehicle operation conditions. While these values are merely examples, a preferred control strategy is adapted to only permit range shifting from (LO) range to (HI) range when the speed of rear output shaft 38 is below a predetermined speed value (i.e., 1000 rpm), and the shift time is less than a predetermined time value (i.e., 4 seconds). It is also important to provide a "recovery" strategy in the event that the on-the move range shift is unsuccessful so as to re-establish the 4LO drive mode.

Figure 12:
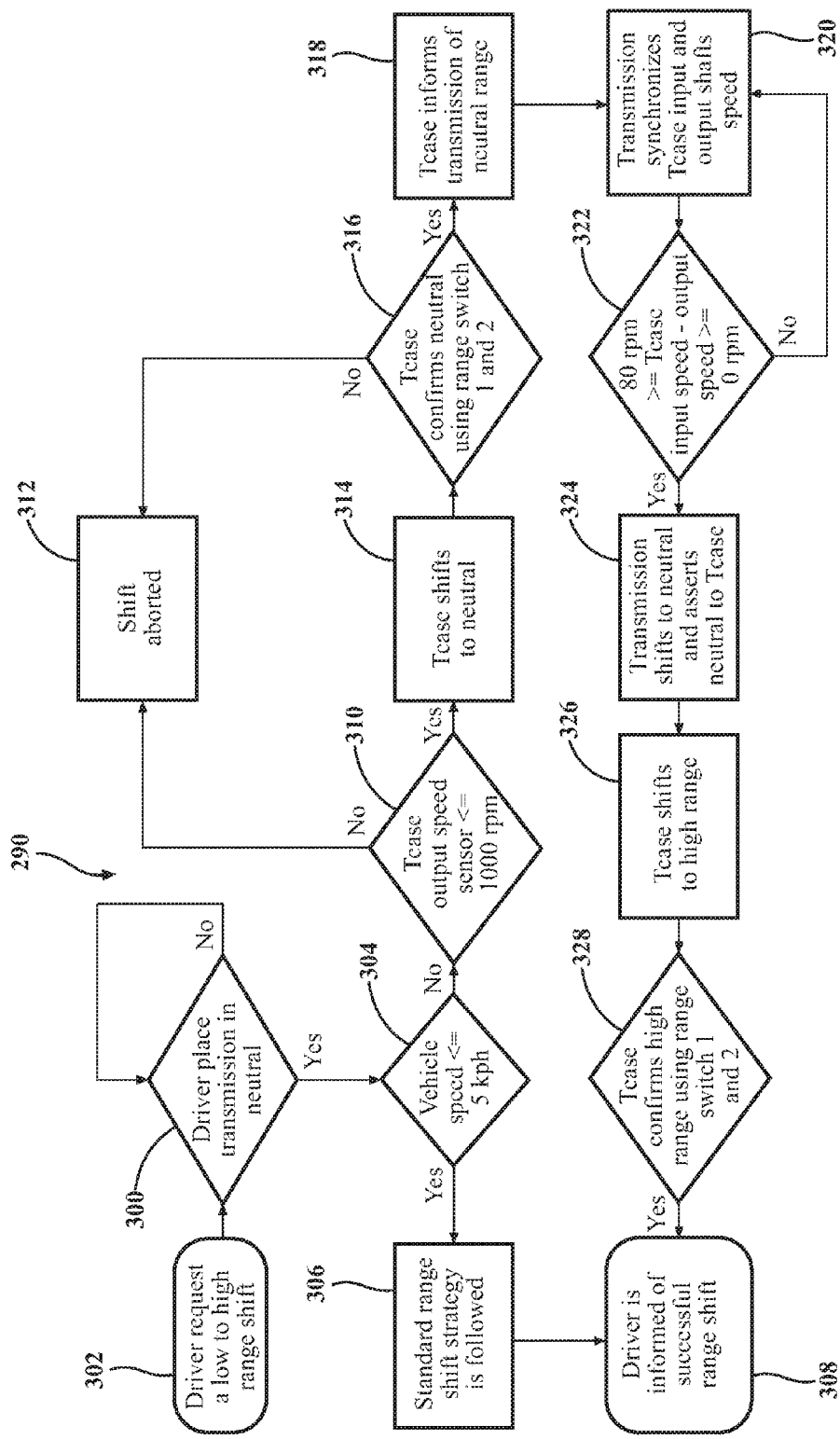
FIG. 12 is a control diagram illustrating the control strategy employed with the range shift mechanism associated with the transfer case.

According to the summary provided at FIG. 12, a control strategy 290 for the desired range shift is initiated when the vehicle operator shifts transmission 18 (i.e., the transmission mode PRNDL) from its Drive (D) mode into its Neutral mode (block 300) followed by making a request via mode select mechanism 50 for a 4LO to 4HI range shift (block 302). If the vehicle's road speed is less than or equal to a predetermined threshold speed (i.e., 5 km/h) as shown in decision block 304, a standard range shift strategy is employed, as illustrated by block 306. This standard shift strategy is intended to include any conventional range shift control protocol and, in this instance, relies on power-operated clutch actuation unit 44, 44' to move range collar 80 while mode clutch 88 is maintained in its fully engaged condition. Upon completion of the desired 4LO to 4HI range shift, the vehicle operator is informed (see block 308) of a successful range shift and is requested to shift transmission 18 back into its Drive (D) mode.

In contrast, if the vehicle road speed (block 304) exceeds the predetermined threshold value, then control system 290 determines whether the output speed of rear output shaft 38 is less than or equal to a predetermined shaft speed value, as indicated by decision block 310. In this example, the threshold shaft speed of rear output shaft 30 is set to 1000 rpm. If the threshold shaft speed is exceeded, the range shift is aborted, as indicated at block 312. However, if the shaft speed of rear output shaft 38 is equal to or less than the threshold value, TCCU 52 actuates the range clutch actuator and moves range collar 80 to its (N) range position, as indicated at block 314. At decision block 316, TCCU 52 confirms that range collar 80 has, in fact, been shifted into its (N) range position. This confirmation of the positive positioning of range collar 80 in its (N) range position can be provided by position sensors (not shown) associated with range collar 80.

In the event that the attempted shift of range collar 80 to its (N) range position is not achieved in a first predetermined period of time (e.g., one second), the shift is aborted and the shift range collar 80 returns back to its 4 (LO) range position. Further, in the event that the attempted shift of range collar 80 to its (N) range position is not achieved in a second predetermined period of time (e.g., 300 milliseconds) and the motor current is greater than a predetermined current (e.g., 16 amperes), then the shift is considered blocked and the shift range collar 80 returns to its 4 (LO) range position. After the occurrence of either of these events, the TCCU 52 may attempt to actuate the range clutch actuator and move the range collar 80 to its (N) range position again. However, if unsuccessful, the driver has to request a low to high shift again.

Block 318 indicates that TCCU 52 informs TCU 53 of transfer case 20 being positively shifted into its (N) range position. Upon confirmation, transmission control unit 53 shifts transmission 18 back into its Drive (D) mode and then functions to control the speed ratio and engine torque to synchronize the speed of the transmission output shaft with the speed of rear output shaft 38, as shown by block 320. Such speed synchronization should be provided within a predefined speed differential range (i.e., 80 rpm) with the transmission output shaft speed exceeding the rear output shaft speed, as indicated by decision block 322. Upon completion of the speed synchronization process, TCU 53 acts to shift transmission 18 from its Drive (D) mode back into its Neutral (N) mode and then TCU 53 signals TCCU 52 of the transmission neutral mode, as indicated at block 324. Thereafter, TCCU 52 signals clutch actuation unit 44, 44' to actuate the range clutch actuator and shift range collar 80 from its (N) range position into its (HI) range position, as indicated at block 326. Decision block 328 indicates that TCCU 52 confirms the positive location of range collar 80 in its (HI) range position. Thereafter, the driver is informed of successful range shift into the 4 (HI) mode at block 308 for shifting transmission 18 back into its Drive (D) mode.

Figure 13:
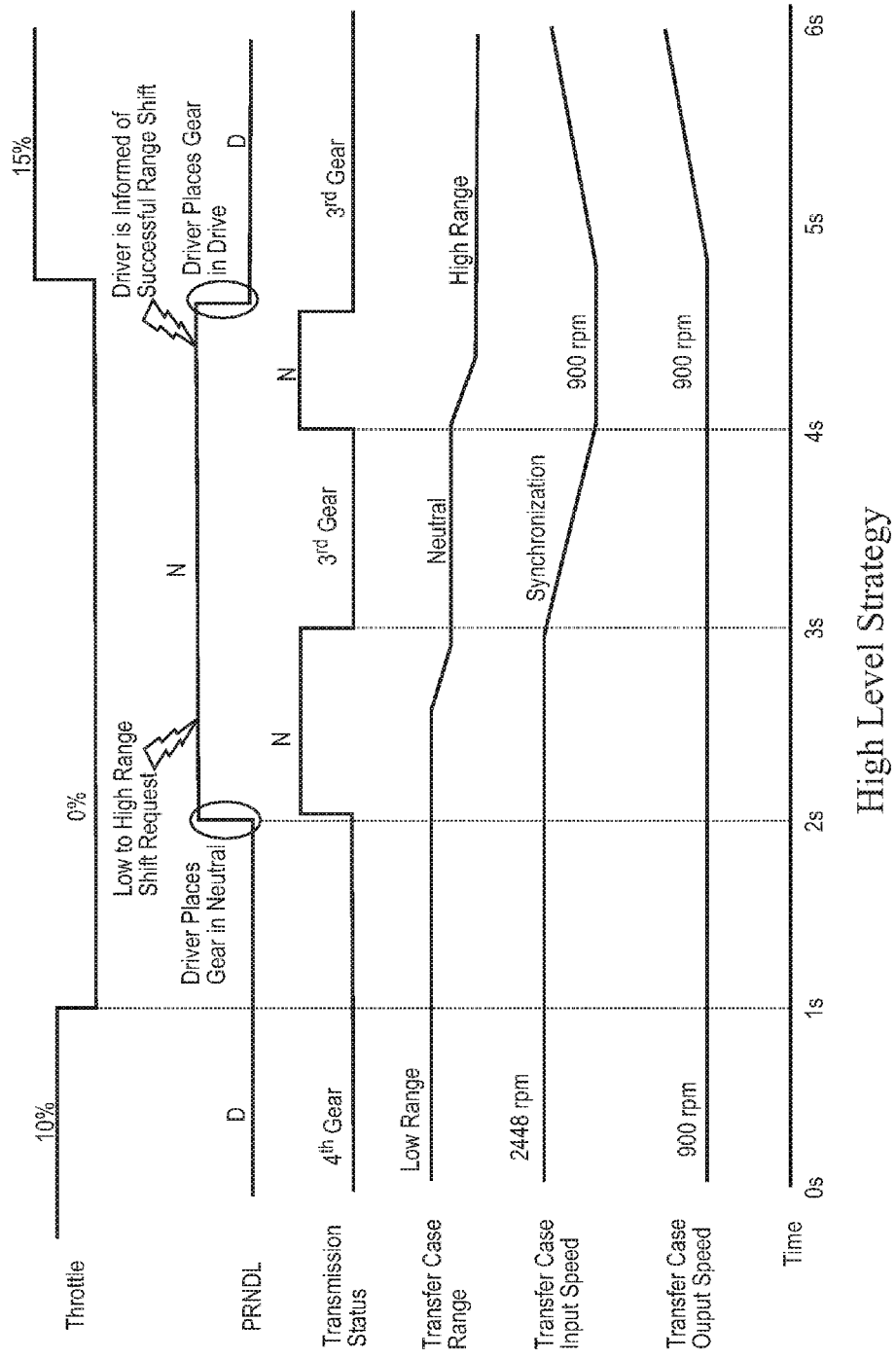
FIG. 13 is an operation vs. time graphical illustration of the range shift control strategy of the present disclosure.

FIG. 13 provides an example timeline chart for a 4LO to 4HI shift of transfer case 20, 20A starting with certain exemplary vehicle operating parameters listed along the left hand side of the plot. These vehicle parameters, assumed to exist at start of the 4LO to 4HI range shift, are shown to include in this non-limiting example: Throttle 10%; Transmission mode Drive (D); transmission gear $4^{th}$; transfer case range position LO; input shaft speed 2448 rpm; and rear shaft speed 900 rpm. This timeline reflects the sequential phases of shifting transmission 18 into its Neutral mode, requesting a 4LO to 4HI range shift, speed synchronization, and completion of the range shift and return of transmission 18 to its Drive mode.

Figure 14:
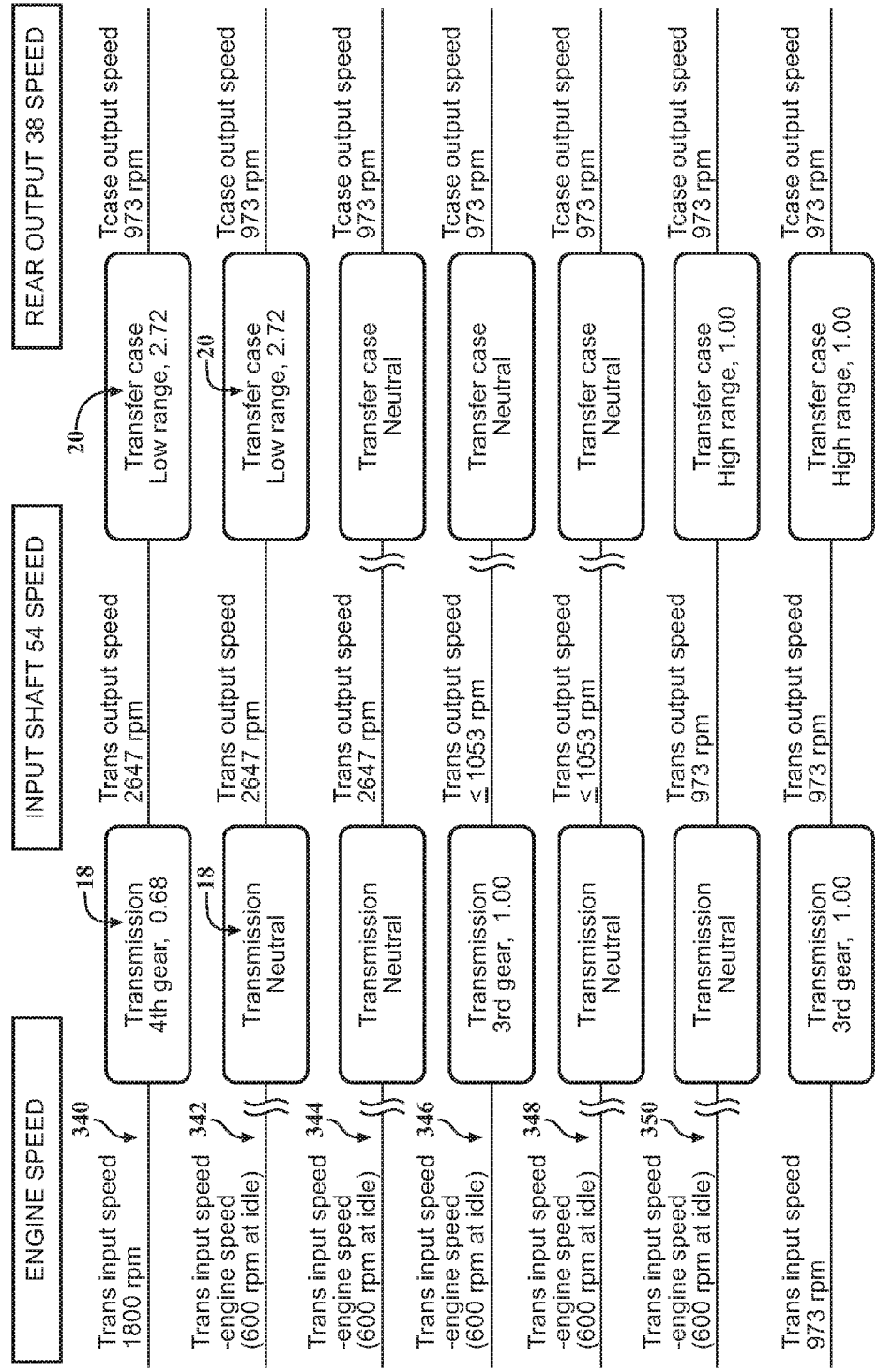
FIG. 14 is a diagram illustrating an example of a speed synchronization process associated with the range shift control system of the present disclosure.

FIG. 14 illustrates an exemplary speed synchronization process associated with control strategy 290. Specifically, seven (7) steps are shown in the non-limiting example to accomplish the speed matching between the transmission output shaft and rear output shaft 38. In particular, line 340 illustrates the operating conditions of the motor vehicle with transmission 18 operating in its $4^{th}$ (overdrive) gear ratio and transfer case 20 operating in its low-range drive connection. Line 342 illustrates the step of shifting transmission 18 into its Neutral (N) mode to reduce the transmission input speed to 600 rpm (i.e., engine idle speed) in this non-limiting example while transfer case 20 remains operating with its low-range drive connection. Line 344 illustrates the subsequent shifting of transfer case 20 into its (N) range for establishing the non-driven connection. Line 346 illustrates shifting transmission 18 back into its Drive (D) mode at its direct drive $3^{rd}$ gear ratio which functions to reduce the rotary speed of input shaft 54 to within the 80 rpm speed difference threshold. Line 348 illustrates subsequent shifting of transmission 18 back into its Neutral (N) mode while transfer case 20 remains in its N non-driven connection condition. At line 350, transfer case 20 is shifted into its high-range drive connection while transmission remains in Neutral. Finally, at line 352, transmission 18 is shifted back into its Drive (D) mode to provide the direct one-to-one drive ratio between the transmission's input shaft and rear output shaft 38.

Figure 15:
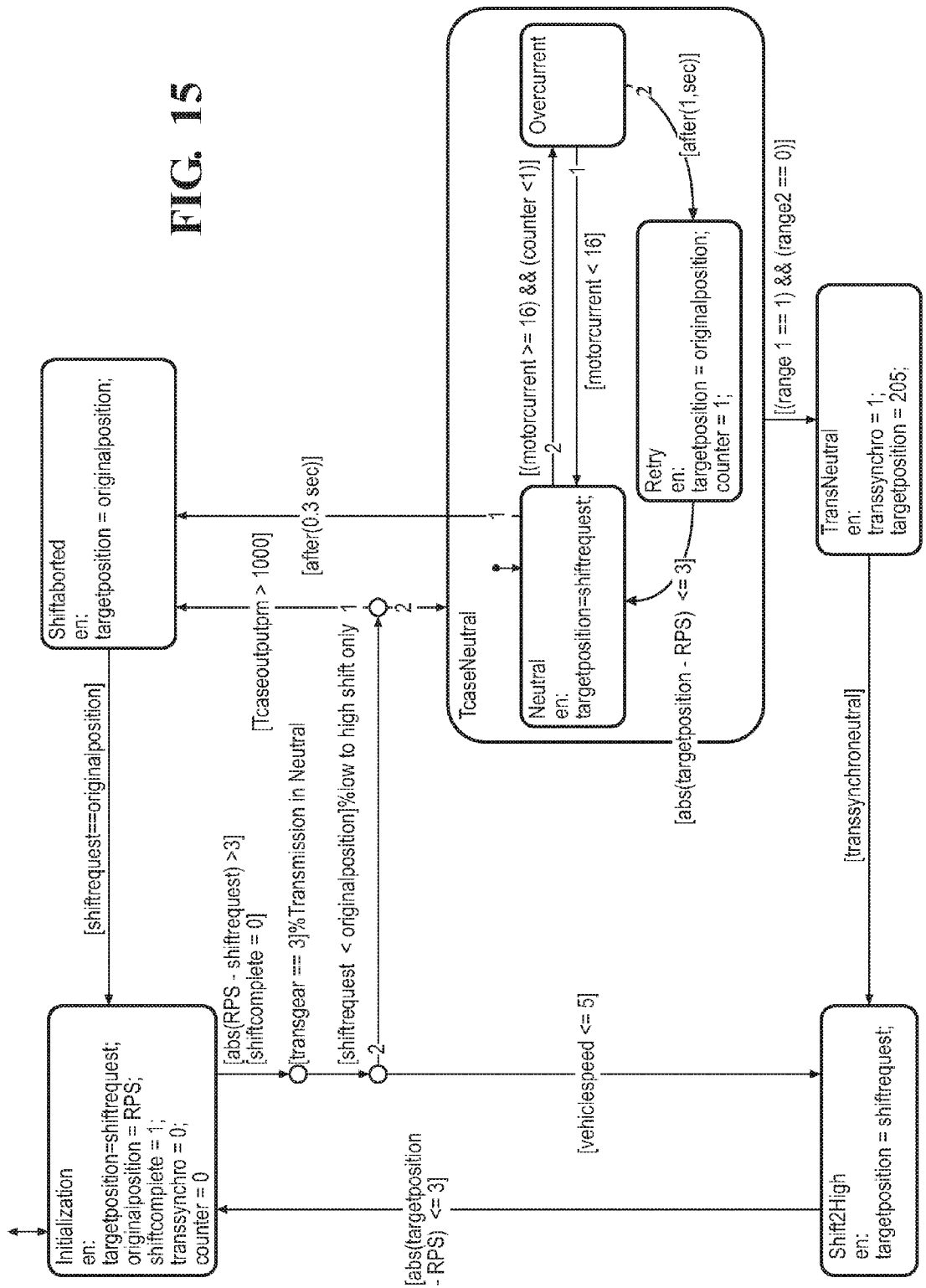
FIG. 15 is a diagram of a state flow control logic associated with the range shift control strategy of the present disclosure.
Figure 16:
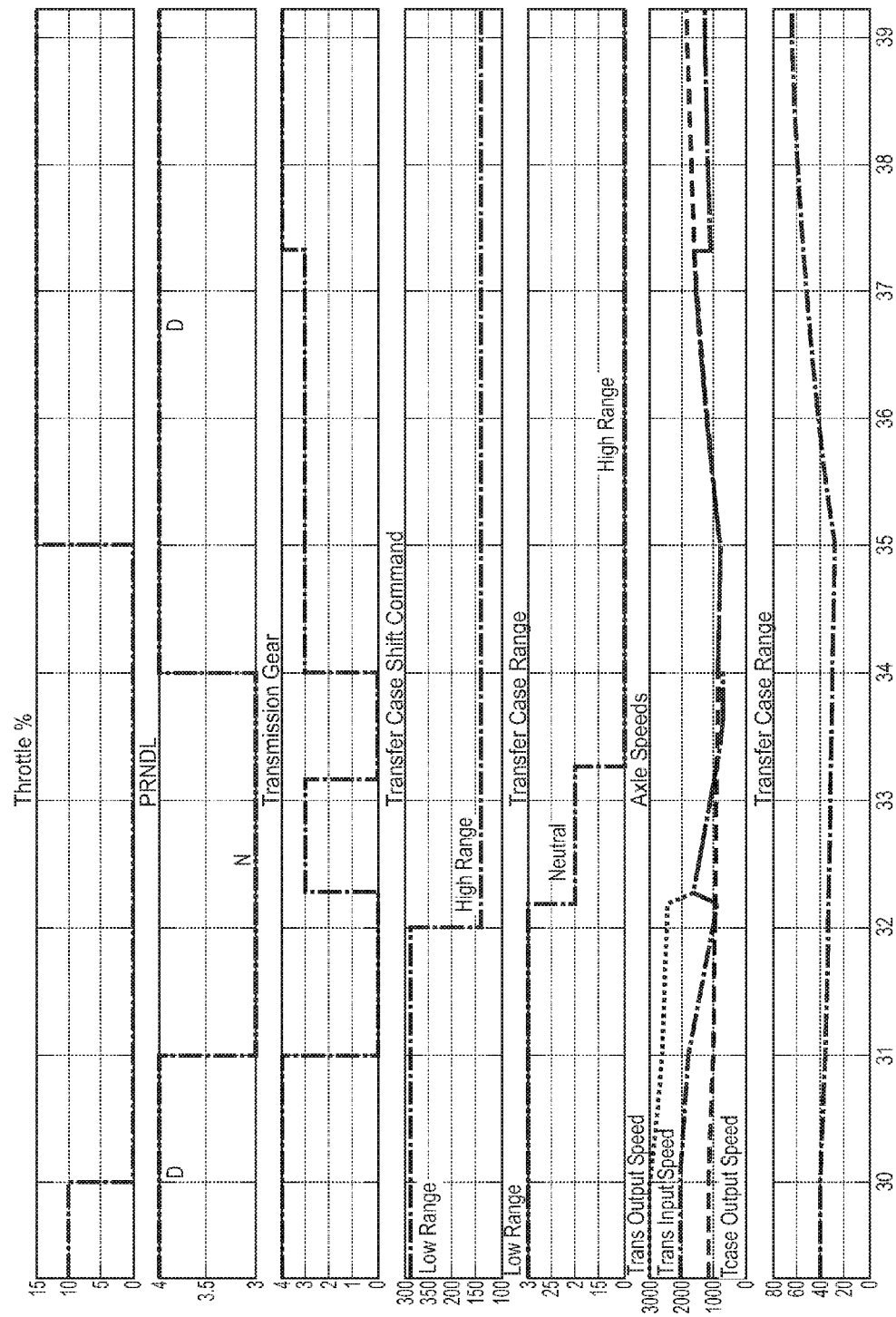
FIG. 16 illustrates simulation results for the range shift control strategy of the present disclosure.

FIG. 15 illustrates a state flow control logic diagram associated with the control system 290 while FIG. 16 provides an illustration of simulation results which are shown to correlate with the anticipated results shown in FIG. 13.

Figure 17:
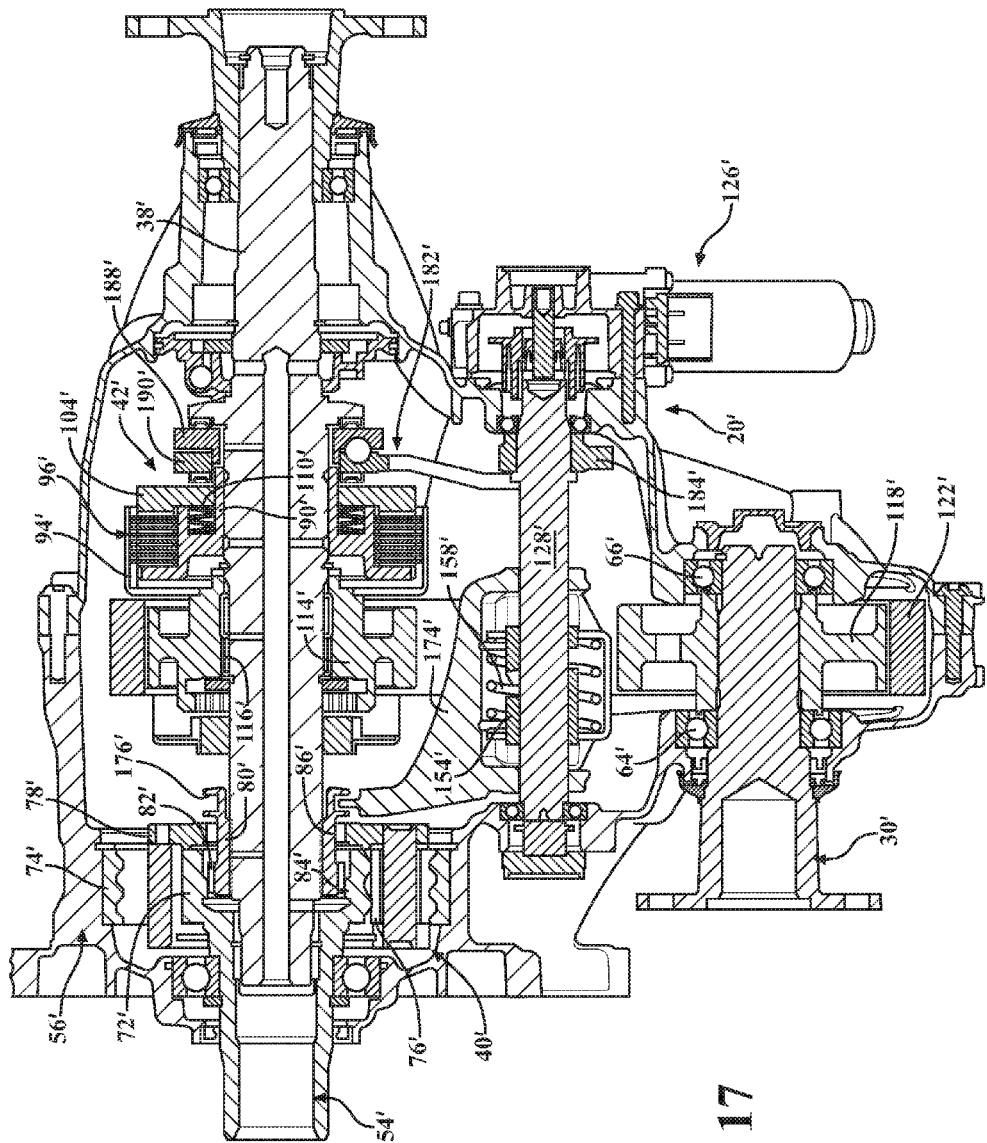
FIG. 17 is a sectional view of another transfer case adapted for use with the control system of the present disclosure Corresponding reference numerals are used throughout all of the drawings to identify similar components.

FIG. 17 is a sectional view of another transfer case 20' to which the present invention is adapted for use. In general, transfer case 20' with the exception that mode clutch unit 42' and ballramp unit 182 are now located rearwardly of first sprocket 112'. However, clutch actuation unit 44' still functions to coordinate actuation of range clutch actuator assembly 130' and mode clutch actuator assembly 132. In view of the overall commonality, primed reference numbers are used with transfer case 20' to identify components similar to those of transfer case 20.

While the above disclosure describes that shifting of transmission 18 between its Drive (D) and Neutral (N) modes in association with the transfer case on-the-move range shift is manually established (via the PDRNL lever), it is also contemplated that such transmission shifting may be completed without driver input under a completely automatic transfer case range shifting control system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case for a vehicle, said transfer case comprising:
    an input shaft for being connected with a transmission output shaft;
    first and second output shafts;
    a reduction gearset driven by said input shaft;
    a range clutch operable in a first range position to establish a drive connection between said input shaft and said first output shaft, further operable in a second range position to establish a drive connection between said reduction gearset and said first output shaft, and further operable in a third range position to uncouple said first output shaft from said input shaft and said reduction unit;
a mode clutch operable in a first mode position to disengage said second output shaft from driven engagement with said first output shaft and further operable in a second mode position to establish a drive connection between said first output shaft and said second output shaft;
a power-operated clutch actuation unit having an electric motor driving an actuator shaft, a range actuator driven by said actuator shaft for moving said range clutch between its first and second range positions, and a mode actuator driven by said actuator shaft for moving said mode clutch between its first and second mode positions; and
a control system for actuating said electric motor to control the magnitude and direction of rotation of said actuator shaft so as to coordinate movement of said range clutch and said mode clutch, wherein said control system includes a transfer case control unit adapted to communicate with vehicle sensors and at least one other vehicle control unit, said control system operable to;
determine a driver request to shift the range clutch from said second range position to said first range position,
determine whether a vehicle speed exceeds a threshold vehicle speed value and whether a rotary speed of said first output shaft exceeds a threshold shaft speed value,
actuate said range actuator to move said range clutch from said second range position into said third range position upon a determination that said vehicle speed exceeds said threshold vehicle speed value and said first output shaft speed exceeds said threshold shaft speed value,
synchronize said first output shaft speed with said input shaft speed,
move said range clutch from said third range position into said first range position after said first output shaft speed and said input shaft speed are synchronized.

2. The transfer case of claim 1 wherein said actuator shaft is rotatable through a first range of travel, a second range of travel, and a third range of travel.

3. The transfer case of claim 2 wherein rotation of said actuator shaft through said first range of travel causes said range actuator to move said range clutch between its first and second range positions while said mode actuator maintains said mode clutch in its first mode position, and wherein rotation of said actuator shaft through said second range of travel causes said range actuator to maintain said range clutch in its first range position while said mode actuator moves said mode clutch between its first and second mode positions.

4. The transfer case of claim 3 wherein rotation of said actuator shaft through said third range of travel causes said range actuator to maintain said range clutch in its second range position while said mode actuator moves said mode clutch between its first and second mode positions.

5. The transfer case of claim 1 wherein said at least one other vehicle control unit is a transmission control unit, said transmission control unit operable to control operation of a multi-speed transmission having a transmission output shaft coupled to said input shaft.

6. The transfer case of claim 1 wherein said range actuator comprises:
a follower fixed for rotation with said actuator shaft;
a range cam supported on said actuator shaft and having a range slot within which said follower is disposed, said range slot configured to convert rotary movement of said actuator shaft into axial movement of said range cam;
a shift fork coupled to said range clutch; and
a biasing mechanism interconnecting said shift fork to said range cam for converting axial movement of said range cam into axial movement of said shift fork for moving said range clutch between its first and second range positions.

7. The transfer case of claim 6 wherein said range slot in said range cam includes a first dwell segment, a second dwell segment and a shift segment interconnecting said first and second dwell segments, said shift segment is configured to cause axial movement of said range clutch between its first and second range positions during rotation of said actuator shaft through a first range of rotary travel, said first dwell segment is configured to maintain said range clutch in its first range position during rotation of said actuator shaft through a second range of rotary travel, and said second dwell segment is configured to maintain said range clutch in its second range position during rotation of said actuator shaft through a third range of rotary travel.

8. The transfer case of claim 1 wherein said mode actuator comprises:
a mode cam driven by said actuator shaft and having a cam surface; and
a ballramp unit having a first cam member, a second cam member disposed for rotation and axial movement relative to said first cam member and rollers disposed in cam grooves formed between said first and second cam members, wherein said mode clutch is moveable between its first and second mode positions in response to movement of said second cam member between a retracted position and an extended position relative to said first cam member, and wherein said cam surface is configured to cause movement of said second cam member between its retracted and extended position in response to rotation of said mode cam with said actuator shaft.

9. The transfer case of claim 8 wherein said first cam member includes a first lever segment disposed on one side of said actuator shaft, and wherein said second cam member includes a second lever segment disposed on an opposite side of said actuator shaft and having a mode follower engaging said cam surface on said mode cam.

10. A drivetrain for a vehicle, comprising:
a transmission including a transmission output shaft, wherein the transmission is operable in a drive mode and a neutral mode, wherein the transmission output shaft is driven in said drive mode, and wherein said transmission output shaft is not driven in said neutral mode;
a transfer case including;
an input shaft connected to said transmission output shaft;
first and second output shafts;
a reduction gearset driven by said input shaft and having an output component driven at a reduced speed relative to said input shaft;
a dog clutch operable in a first range position to couple said input shaft to said first output shaft for establishing a high-range drive connection, said dog clutch is further operable in a second range position to couple said output component of said reduction gearset to said first output shaft for establishing a low-range drive connection, and said dog clutch is further operable in a third range position to uncouple said first output shaft from said input shaft and said reduction gearset;

a mode clutch including a clutch pack operably disposed between said first and second output shafts and a pressure plate moveable between a first mode position whereat a minimum clutch engagement force is exerted on said clutch pack and a second mode position whereat a maximum clutch engagement force is exerted on said clutch pack;

an actuation mechanism including a motor driving an actuator shaft, a range actuator driven by said actuator shaft for moving said dog clutch between its first and second range positions, and a mode actuator driven by said actuator shaft for moving said pressure plate between its first and second mode positions, said actuator shaft being rotatable through three distinct ranges of rotary travel for causing said range actuator and said mode actuator to coordinate movement of said dog clutch and said pressure plate; and a control system for controlling actuation of said motor so as to coordinate actuation of said dog clutch and said mode clutch, said control system including a transfer case control unit adapted to communicate with vehicle sensors and a transmission control unit for moving said dog clutch, said control system operable to;

shift said transmission into said neutral mode, determine a driver request to shift said dog clutch from said second range position to said first range position, determine whether a vehicle speed exceeds a threshold vehicle speed value and whether a first output shaft speed of said first output shaft exceeds a threshold shaft speed value, actuate said range clutch actuator to move said dog clutch from said second range position into said third range position upon a determination that said vehicle speed exceeds said threshold vehicle speed value and said first output shaft speed exceeds said threshold shaft speed value, shift said transmission into said drive mode and synchronize a transmission output shaft speed of said transmission output shaft and said first output shaft speed with an input shaft speed of said input shaft to a predetermined differential value, shift said transmission into said neutral mode when a rotary speed differential between said transmission output shaft speed and said first output shaft speed is equal to or less than said predetermined differential value, move said dog clutch from said third range position into said first range position after said first output shaft speed and said input shaft speed are synchronized, shift said transmission into said drive mode.

11. The transfer case of claim 10 wherein said actuator shaft is rotatable through a first range of travel for causing said range actuator to move said dog clutch between its first and second range positions while said mode actuator maintains said pressure plate in its first mode positions, wherein said actuator shaft is rotatable through a second range of travel for causing said range actuator to maintain said dog clutch in its first range position while said mode actuator moves said pressure plate between its first and second mode positions, and wherein said actuator shaft is rotatable through a third range of travel for causing said range actuator to maintain said dog clutch in its second range position while said mode actuator moves said pressure plate between its first and second mode positions.

12. The transfer case of claim 10 wherein said transmission control unit is operable to control shifting of a multi-gear transmission having said transmission output shaft coupled to said input shaft.

13. The transfer case of claim 10 wherein said range actuator comprises:

a follower fixed for rotation with said actuator shaft;

a range cam supported on said actuator shaft and having a shift slot within which said follower is disposed, said shift slot is configured to convert rotary movement of said actuator shaft into axial movement of said range cam;

a shift fork coupled to said dog clutch; and a biasing mechanism interconnecting said shift fork to said range cam which is operable to convert axial movement of said range cam into axial movement of said shift fork for moving said dog clutch between its first and second range positions.

14. The transfer case of claim 13 wherein said shift slot in said range cam includes a first dwell segment, a second dwell segment and a shift segment interconnecting said first and second dwell segments, said shift segment is configured to cause axial movement of said dog clutch between its first and second range positions during rotation of said actuator shaft through a first range of rotary travel, said first dwell segment is configured to maintain said dog clutch in its first range position during rotation of said actuator shaft through a second range of rotary travel, and said second dwell segment is configured to maintain said dog clutch in its second range position during rotation of said actuator shaft through a third range of rotary travel.

15. The transfer case of claim 10 wherein said mode actuator comprises:

a mode cam driven by said actuator shaft and having a cam surface; and a ballramp unit having a first cam member, a second cam member disposed for rotation and axial movement relative to said first cam member and rollers disposed in cam grooves formed between said first and second cam members, wherein said pressure plate is moveable between its first and second mode positions in response to movement of said second cam member between a retracted position and an extended position relative to said first cam member, and wherein said cam surface is configured to cause movement of said second cam member between its retracted and extended position in response to rotation of said mode cam with said actuator shaft.

16. The transfer case of claim 9 wherein said first cam member includes a first lever segment disposed on one side of said actuator shaft, and wherein said second cam member includes a second lever segment disposed on an opposite side of said actuator shaft and having a mode follower engaging said cam surface on said mode cam.

17. A method for controlling on-the-move range shifting of a four-wheel drive vehicle, said method comprising:

providing a powertrain for generating drive torque and including a multi-gear transmission having a transmission output shaft;

providing a rear driveline and a front driveline;

providing a transfer case comprising: an input shaft connected to said transmission output shaft; a rear output shaft connected to said rear driveline; a front output shaft connected to said front driveline; a reduction unit driven by said input shaft; a range clutch operable in a first range position to drivingly couple said rear output shaft to said input shaft, in a second range position to drivingly couple said rear output shaft to said reduction unit, and in a third range position to uncouple said rear output shaft from said input shaft and said reduction unit; a mode clutch operable for selectively coupling said front output shaft to said rear output shaft; and a power-operated clutch actuation unit having a range clutch actuator operable for controlling actuation of said mode clutch;

providing a transmission control unit (TCU) operable for controlling operation of said transmission;

providing a transfer case control unit (TCCU) operable for controlling actuation of said power-operated clutch actuation unit, said TCCU communicating with said TCU;

shifting said transmission into a Neutral non-driven mode;

providing a mode shift signal to said TCCU indicative of a driver request to shift said transfer case from a low-range mode into a high-range mode;

determining whether a vehicle speed of the motor vehicle exceeds a threshold vehicle speed value and whether a rotary speed of said rear output shaft exceeds a threshold shaft speed value and providing a vehicle speed signal and a shaft speed signal to said TCCU;

causing said TCCU to control said clutch actuation unit and actuate said range clutch actuator to move said range clutch from its second range position into its third range position when said vehicle speed signal indicates said vehicle speed exceeds said threshold vehicle speed value and said shaft speed signal indicates said rear output shaft speed exceeds said threshold shaft speed value;

causing said TCU to shift said transmission into a driven mode for synchronizing the rotary speeds of said transmission output shaft and said rear output shaft to a predetermined differential value and subsequently shifting said transmission back into its Neutral mode when a rotary speed differential between said transmission output shaft and said rear output shaft is less than said predetermined differential value;

causing said TCCU to control said clutch actuation unit and actuate said range clutch actuator to move said range clutch from its third range position into its first range position; and causing said TCU to shift said transmission into its driven mode.

18. The method as set forth in claim 17 wherein the threshold vehicle speed is 5 km/h.

19. The method as set forth in claim 17 wherein the threshold shaft speed is 1000 rpms.

20. The method as set forth in claim 17 wherein the predetermined differential value is 80 rpms.

* * * * *